United States Patent
Ninomiya

(10) Patent No.: US 12,135,422 B2
(45) Date of Patent: Nov. 5, 2024

(54) VIRTUAL IMAGE DISPLAY DEVICE

(71) Applicant: DENSO CORPORATION, Kariya (JP)

(72) Inventor: Yasunori Ninomiya, Kariya (JP)

(73) Assignee: DENSO CORPORATION, Kariya (JP)

(*) Notice: Subject to any disclaimer, the term of this patent is extended or adjusted under 35 U.S.C. 154(b) by 655 days.

(21) Appl. No.: 17/380,644

(22) Filed: Jul. 20, 2021

(65) Prior Publication Data

US 2021/0349313 A1    Nov. 11, 2021

Related U.S. Application Data

(63) Continuation of application No. PCT/JP2020/000808, filed on Jan. 14, 2020.

(30) Foreign Application Priority Data

Feb. 1, 2019  (JP) ................. 2019-017227

(51) Int. Cl.
*G02B 27/01* (2006.01)
*B60K 35/00* (2024.01)
*B60K 35/23* (2024.01)

(52) U.S. Cl.
CPC .......... *G02B 27/0101* (2013.01); *B60K 35/00* (2013.01); *B60K 35/23* (2024.01); *B60K 2360/23* (2024.01)

(58) Field of Classification Search
CPC .... B60K 35/00–90; G02B 27/01–0189; G02B 2027/0105–0198
See application file for complete search history.

(56) References Cited

U.S. PATENT DOCUMENTS

2011/0051029 A1*  3/2011  Okumura ........... G02B 27/0101
                                                    359/831
2019/0025579 A1   1/2019  Furusawa et al.
2019/0146218 A1   5/2019  Yamazoe et al.

FOREIGN PATENT DOCUMENTS

| | | |
|---|---|---|
| DE | 102016113945 A1 | 2/2018 |
| EP | 3327484 A1 | 5/2018 |
| JP | S55179932 U | 12/1980 |
| JP | 2001030799 A | 2/2001 |
| JP | 2014191321 A | 10/2014 |
| JP | 2018116157 A | 7/2018 |
| WO | WO-2017126457 A1 | 7/2017 |
| WO | WO-2017195741 A1 | 11/2017 |

* cited by examiner

*Primary Examiner* — Bao-Luan Q Le
*Assistant Examiner* — Christopher A Lamb, II
(74) *Attorney, Agent, or Firm* — Harness, Dickey & Pierce, P.L.C.

(57) ABSTRACT

A virtual image display device includes a display that emits display light, a reflective mirror that has a reflective surface, and a housing that houses the display and the reflective mirror and has an opening. The housing includes a wall structure on a portion of a surface of the housing. The wall structure includes a plurality of first walls that face in a first common direction and a plurality of second walls that face in a second common direction different from the first common direction. The plurality of first walls and the plurality of second walls are alternately arranged and are connected to each other one by one along the surface of the housing.

18 Claims, 13 Drawing Sheets

| FIRST MIRROR | SECOND MIRROR | THIRD MIRROR |
|---|---|---|
| CONCAVE MIRROR | PLANE MIRROR | — |
| CONCAVE MIRROR | CONVEX MIRROR | — |
| CONCAVE MIRROR | CONCAVE MIRROR | — |
| PLANE MIRROR | CONCAVE MIRROR | — |
| CONCAVE MIRROR | PLANE MIRROR | CONCAVE MIRROR |
| CONCAVE MIRROR | CONVEX MIRROR | CONCAVE MIRROR |

VIRTUAL IMAGE DISPLAY DEVICE

CROSS REFERENCE TO RELATED APPLICATIONS

This application is a continuation application of International Patent Application No. PCT/JP2020/000808 filed on Jan. 14, 2020, which designated the U.S. and claims the benefit of priority from Japanese Patent Application No. 2019-017227 filed on Feb. 1, 2019. The entire disclosure of all of the above application is incorporated herein by reference.

TECHNICAL FIELD

The present disclosure relates to a virtual image display device.

BACKGROUND ART

A virtual image display device for displaying a virtual image has been known. Such a device includes a display, a reflective mirror, and a housing. The reflective mirror is designed to divide external light from an outside of the housing into a transmitted light and a reflected light. The inner wall of the housing is provided with a heat-radiating member having serrated irregularities and coated with a light-absorbing paint, and the transmitted light having traveled through the reflective mirror is efficiently absorbed by the heat-radiating member and converted into heat. Then, the converted heat is dissipated to the outside of the device through the outer wall.

SUMMARY

One aspect of the present disclosure is a virtual image display device for displaying a virtual image. The device includes a display that emits display light that is to be imaged as the virtual image, a reflective mirror that has a reflective surface to reflect the display light emitted from the display, and a housing that houses the display and the reflective mirror and has an opening through which the display light reflected by the reflective mirror exits the housing.

The housing includes a wall structure on a portion of a surface of the housing such that an external light that enters the housing through the opening from an outside of the housing and is reflected by the reflective surface reaches the wall structure.

The wall structure includes a plurality of first walls that face in a first common direction and a plurality of second walls that face in a second common direction different from the first common direction.

The plurality of first walls and the plurality of second walls are alternately arranged and are connected to each other one by one along the surface of the housing.

BRIEF DESCRIPTION OF DRAWINGS

The above and other objects, features and advantages of the present disclosure will become more apparent from the following detailed description made with reference to the accompanying drawings.

DESCRIPTION OF EMBODIMENTS

Figure 1:
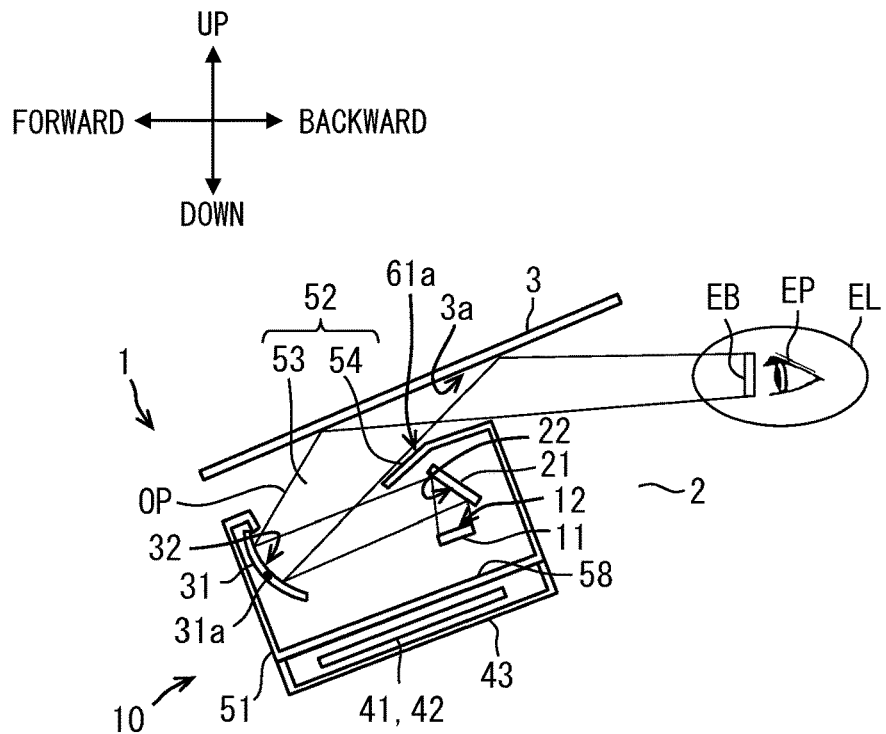
FIG. 1 is a schematic view showing a head-up display device mounted in a vehicle according to a first embodiment.

To begin with, a relevant technology will be described only for understanding the following embodiments. As a result of detailed investigations by the inventors, the following problem has been found. After the external light is reflected by the reflective surface of the reflective mirror, the external light enters the surface of the housing and is secondarily reflected by the surface to reach eyes of the viewer of the virtual image. If the secondarily reflected light of the external light reaches eyes, the visibility of the virtual image is lowered due to the glare. However, in a conventional device, sufficient measures are not taken for the reflected light reflected on the reflective surface of the reflective mirror.

One objective of the present disclosure is to provide a virtual image display device having excellent visibility of a virtual image.

As described above, one aspect of the present disclosure is a virtual image display device for displaying a virtual image. The device includes a display that emits display light that is to be imaged as the virtual image, a reflective mirror that has a reflective surface to reflect the display light emitted from the display, and a housing that houses the display and the reflective mirror and has an opening through which the display light reflected by the reflective mirror exits the housing. The housing includes a wall structure on a portion of a surface of the housing such that an external light that enters the housing through the opening from an outside of the housing and is reflected by the reflective surface reaches the wall structure. The wall structure includes a plurality of first walls that face in a first common direction and a plurality of second walls that face in a second common direction different from the first common direction. The plurality of first walls and the plurality of second walls are alternately arranged and are connected to each other one by one along the surface of the housing.

Accordingly, the housing is provided with the wall structure having the first walls and the second walls that are alternately connected to each other one by one. The wall structure is formed on the portion that is a portion of the surface of the housing where external light enters the housing through the opening from an outside and is reflected toward, and arrives, the reflective surface of the reflective mirror. Therefore, it is possible to prevent, by the wall structure, the external light that has reached the wall structure after reflected by the reflective surface from secondarily reaching eyes of the viewer of the virtual image. At least all secondary reflected light is prevented from reaching the eye. Therefore, it is possible to prevent eyes of the viewer from being dazzled by the external light.

Further, the first wall and the second wall are arranged along the surface of the housing. Therefore, it is possible to avoid a situation where the top of the structure significantly protrudes and interferes with the display optical path by the display light from the display. By the suppression of interference with the display optical path, the display light can sufficiently reach the eyes of the viewer and can be imaged as a virtual image. Accordingly, it is possible to provide a virtual image display device having excellent visibility of a virtual image.

In addition to the above, a space where the virtual image is visible is defined as a visible area, a straight line extending from one end of the reflective surface to a first wall is defined as an end reference first straight line, an angle formed by the first wall with respect to the end reference first straight line is defined as an end reference first wall angle that is formed on a side of the first wall opposite to the one end of the reflective surface, wherein the end reference first wall angle is positive when formed on an exposed side of the surface with respect to the end reference first straight line and is negative when formed on a side opposite to the exposed side, an angle formed by the first wall with respect to the end reference first straight line is defined as a visible area first critical angle that is formed on a side of the first wall opposite to the one end of the reflective surface, wherein the visible area first critical angle is positive when formed on the exposed side of the surface with respect to the end reference first straight line and is negative when formed on the side opposite to the exposed side, and the visible area first critical angle is virtually set such that a light travelling along the end reference first straight line from the one end of the reflective surface and incident on the first wall reaches one end of the visible area after reflected by the first wall, a straight line extending from the other end of the reflective surface to a second wall is defined as an end reference second straight line, an angle formed by the second wall with respect to the end reference second straight line is defined as an end reference second wall angle that is formed on a side of the second wall opposite to the other end of the reflective surface, wherein the end reference second wall angle is positive when formed on the exposed side of the surface with respect to the end reference second straight line and is negative when formed on the side opposite to the exposed side, an angle formed by the second wall with respect to the end reference second straight line is defined as a visible area second critical angle that is formed on a side of the second wall opposite to the other end of the reflective surface, wherein the visible area second critical angle is positive when formed on the exposed side of the surface with respect to the end reference second straight line and is negative when formed on the side opposite to the exposed side, and the visible area second critical angle is virtually set such that a light travelling along the end reference second straight line from the other end of the reflective surface and incident on the second wall reaches the other end of the visible area after reflected by the second wall, and each first wall and each second wall are formed such that the end reference first wall surface angle is larger than the end reference second wall surface angle, the end reference first wall angle is larger than the visible area first critical angle, and the end reference second wall angle is smaller than the visible area second critical angle.

Accordingly, by satisfying the above-described conditions, the reflected light, which is external light having reached the wall structure from the reflective surface and reflected by the wall structure, is less likely to reach an inside region of the visual area. Therefore, it is possible to prevent the external light from secondarily reaching the eyes of the viewer at the same time of recognizing the virtual image. Therefore, it is possible to prevent eyes of the viewer from being dazzled by the external light when recognizing the virtual image and thus the visibility of the virtual image can be improved.

Hereinafter, a plurality of embodiments will be described with reference to the drawings. It should be noted that the same reference numerals are assigned to the corresponding components respectively in the respective embodiments, so that duplicative descriptions may be omitted. When only a part of the configuration is described in the respective embodiments, the configuration of the other embodiments described before may be applied to other parts of the configuration. Further, not only the combinations of the configurations explicitly shown in the description of the respective embodiments, but also the configurations of the plurality of embodiments can be partially combined even if they are not explicitly shown if there is no problem in the combinations in particular.

First Embodiment

As shown in FIG. 1, a virtual image display device according to a first embodiment of the present disclosure is mounted in a vehicle 1 as a transport or a moving body. The virtual image display device is a head-up display device (hereinafter referred to as an HUD device) 10 housed in an instrument panel 2 of the vehicle 1.

The HUD device 10 emits a display light toward a windshield 3 of the vehicle 1. As a result, the HUD device 10 displays an image as a virtual image that can be visually recognized by a passenger of the vehicle 1. That is, the display light reflected by the windshield 3 reaches a visible area EB set in the interior of the vehicle 1. As a result, the passenger, who is seated on a seat facing the instrument panel 2 and whose eye point EP is located in the visible area EB, perceives a virtual image formed through image formation of the display light. Then, the passenger can recognize various types of information displayed as virtual images. The various types of information displayed as a virtual image may be, for example, information indicative of a state of the vehicle such as a vehicle speed and a remaining fuel. The information may be also visibility assisting information and navigation information such as road information.

In the following description, unless otherwise noted, the directions indicated by the forward (front), backward (rear), up, low, left, and right are denoted with respect to the vehicle 1 on a horizontal plane.

The windshield 3 of the vehicle 1 is a translucent plate formed of, for example, a synthetic resin or a glass. The windshield 3 is placed above the instrument panel 2. The windshield 3 tilts to be gradually spaced away from the instrument panel 2 from the front side to the rear side. The windshield 3 has a plate surface 3a formed in a smooth concave or flat shape on an interior side of the vehicle 1. The windshield 3 functions as a projection screen onto which display light is projected from the HUD device 10.

The visible area EB is a spatial region where the virtual image displayed by the HUD device 10 is visible. The visual recognition area is also called an eye-box. The term "visible" used herein means, for example, a state in which the entire virtual image has brightness equal to or higher than a predetermined value so that the contents of a displayed image can be recognized. Typically, the visible area EB is set so as to overlap with an eyelips that is defined in the vehicle 1. The eyelips EL is a virtually defined spatial area set for each vehicle type, and is set in a virtual ellipsoidal shape based on an eye range that statistically represents a spatial distribution of the eye point EP of a passenger (JISD0021: see also 1998). For example, the eyelips EL is located near a headrest of the seat.

As the eyelips EL, an eyelips of the 90th percentile or more and the 99th percentile or less, such as the 90th percentile eyelips, the 95th percentile eyelips, and the 99th percentile eyelips, may be preferably used. In this embodiment, the 90th percentile eyelips is used.

Figure 2:
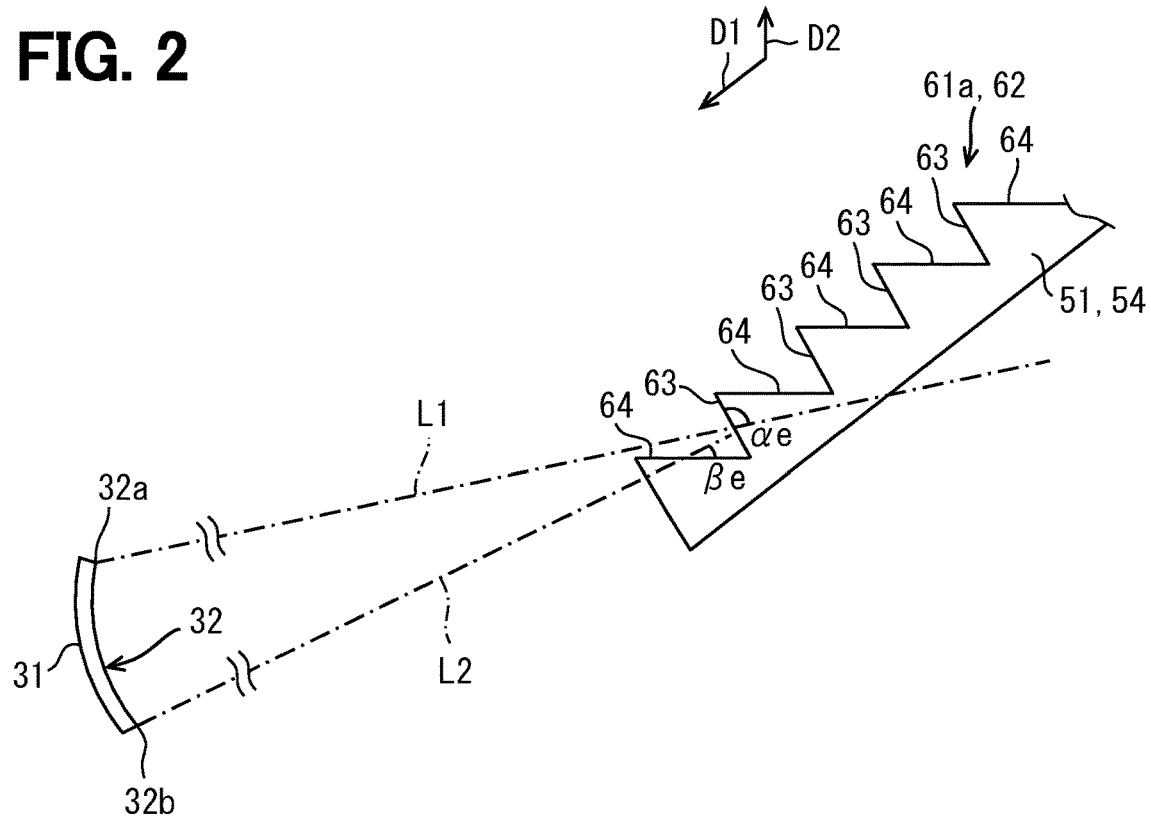
FIG. 2 is an enlarged view showing a wall structure of the first embodiment, and is a diagram for explaining an end reference first wall angle and an end reference second wall angle.

Specific configurations of the HUD device 10 will be described below with reference to FIGS. 1 and 2. The HUD device 10 includes a display 11, a plane mirror 21, a concave mirror 31, a control unit 41, a housing 51, and the like.

The display 11 is, for example, a transmissive liquid crystal display. The display 11 is formed by housing a liquid crystal panel and a backlight in a casing. The display 11 emits a display light, which is to be imaged as a virtual image, by illuminating the screen 12 of the liquid crystal panel with a backlight. As the display 11, various types of displays, such as a liquid crystal display, an EL display, a laser scanner display, or a digital light processing display (DLP display (a registered trademark)) may be used. The liquid crystal display displays an image by using a reflective liquid crystal panel. The EL display emits light by itself using electroluminescence. The DLP display uses a digital micromirror device (DMD). The screen 12 of the display 11 faces upward, for example, and the display light is emitted upward.

The plane mirror 21 and the concave mirror 31 are reflectors that guide the display light emitted from the display 11 toward the windshield 3. The plane mirror 21 is formed as a rectangular flat plate made from glass or synthetic resin, for example. The plane mirror 21 has a reflective surface 22 formed by depositing a metal film such as aluminum on the surface of the plane mirror 21. The reflective surface 22 is formed in a smooth planar shape. The plane mirror 21 is located above the display 11, and the reflective surface 22 faces in an oblique direction forward and downward. The display light incident on the plane mirror 21 from the display 11 is reflected by the reflective surface 22 toward the concave mirror 31.

The concave mirror 31 is formed as a rectangular flat plate made from glass or synthetic resin, for example. The concave mirror 31 has a reflective surface 32 formed by depositing a metal film such as aluminum on the surface of the concave mirror 31. The reflective surface 32 is formed in a smooth concave surface shape that is curved to have a recessed center portion. The concave mirror 31 is located in front of the plane mirror 21, and the reflective surface 32 faces in an oblique direction rearward and upward. The display light incident on the concave mirror 31 from the plane mirror 21 is reflected by the reflective surface 32 toward the windshield 3 that is located above the reflective surface 32. Here, the display light is focused and a virtual image is enlarged when reflected by the reflective surface 32.

More specifically, the reflection angle of the display light on the windshield 3 is preferably set near the Brewster angle larger than 45 degrees in consideration of Fresnel's equations. Therefore, the traveling direction of the display light reflected on the reflective surface 32 of the concave mirror 31 is a obliquely backward and upward direction. That is, a display optical path OP from the concave mirror 31 to the windshield 3 extends linearly in an upward, backward and oblique direction with respect to the concave mirror 31.

The control unit 41 includes an adjustment switch (not shown), a control circuit 42, and the like. The adjustment switch is installed outside of the housing 51. For example, the switch is disposed in the steering wheel of the vehicle 1 so that a passenger can operate the switch.

The control circuit 42 is an electronic circuit having at least one processor, a memory device (for example, a semiconductor memory), an input/output interface, and the like on a substrate.

The control circuit 42 controls the display 11. Further, the control circuit 42 controls the concave mirror 31 and its reflective surface 32 to rotate within a predetermined angle range about a rotation shaft 31a extending in a left-right direction in response to the operation of the adjustment switch. By such rotation, the reflection direction by the reflective surface 32 is adjusted. Accordingly, the direction of the display optical path OP is slightly changed, and the visible area EB and the virtual image move up and down.

The housing 51 is made of, for example, synthetic resin, glass or the like and is formed in a plate-like shape having a light transmissive property. The housing 51 houses the display 11, the plane mirror 21, and the concave mirror 31. The control circuit 42 is housed in a circuit case 43 that is attached to a lower side of the housing 51.

The housing 51 has an opening 53 that optically opens upward toward the windshield 3. The opening 53 is defined on a ceiling portion 52 of the housing 51 that is opposite to a bottom portion 58 across an internal space of the housing 51. The opening 53 is a part of the ceiling portion 52 of the housing 51, and is positioned at a front side, that is, positioned above the concave mirror 31. Accordingly, the opening 53 allows the display light reflected by the concave mirror 31 to pass therethrough to exit the housing 51. The opening 53 may be closed by a dustproof sheet formed in a translucent thin plate shape.

A ceiling wall 54 arranged to cover the plane mirror 21 from an upper side is formed behind the opening 53 in the ceiling portion 52 of the housing 51. The ceiling wall 54 extends substantially in parallel with the display optical path OP to avoid interference with the display optical path OP extending in the oblique direction.

The housing 51 includes surfaces exposed to the inside or the outside. One surface formed by the ceiling wall 54 includes a portion 61a that is exposed to an outside of the housing 51 to face the windshield 3.

An external light reflected on the reflective surface 32 of the concave mirror 31 reaches the portion 61a. For example, an external light such as sunlight passes through the windshield 3, which is disposed outside of the housing 51, at a position offset rearward from a portion of the windshield 3 on which the display light is projected, and then the external light travels in a front, downward, and oblique direction. Such external light enters the housing 51 through the opening 53 and is reflected by the reflective surface 32 of the concave mirror 31. Then, since the reflection angle of the external light on the reflective surface 32 is smaller than the reflection angle of the display light, the external light reaches the portion 61a that is located slightly offset downward from the display optical path OP.

If the portion 61a is formed into a single mirror surface shape, the external light that reaches the portion 61a would be secondarily reflected by the portion 61a and directly or further reflected by the windshield 3. Then, the external light would reach the visible area EB. In view of the above, in the present embodiment, a wall structure 62 is formed on the portion 61a to control the reflecting direction, as shown in FIG. 2. The wall structure 62 has a zigzag pattern (i.e., a saw blade shape) formed of a plurality of first walls 63 and a plurality of second walls 64 that are alternately arranged on the portion 61a that extends in substantially parallel with the display optical path OP. The plurality of first walls 63 and the plurality of second walls 64 are alternately connected to each other. It should be noted that "alternately connected" means that two or more pairs of the first wall 63 and the second wall 64 exist.

The plurality of first walls 63 face in a first common direction D1. On the other hand, the plurality of second walls 64 face in a second common direction D2 that is different from the first common direction D1. Here, the first and second common directions may be conceptually same, and the gradients of the first walls 63 are not necessarily exactly the same as each other and the gradients of the second walls 64 are not necessarily exactly the same as each other. In other words, each first wall 63 faces, for example, the concave mirror 31, and each second wall 64 faces, for example, the windshield 3.

Each of the plurality of walls 63 and 64 has a flat and elongated stripe shape extending in a direction, that is, in a left-right direction, intersecting the display optical path OP that extends in parallel with the portion 61a. The width of the first wall 63 in a direction perpendicular to the extending direction and the width of the second wall 64 in a direction perpendicular to the extending direction are set to be sufficiently smaller than the dimensions of the reflective surface 32 of the concave mirror 31. In the embodiment, for example, each of the widths is set to 2 cm or less, more preferably 0.5 mm or less, but it can be set as large as about 10 cm by reducing the number of the walls 63 and 64. Further, each of the widths of the walls 63 and 64 may be the same as each other or may be different as appropriate.

Further, a coating film that absorbs external light is applied on each of the first walls 63 and the second walls 64. Instead of forming the coating film, each of the first walls 63 and the second walls 64 may be formed into a rough surface by embossing or the like.

Here, an angle of the first wall 63 and an angle of the second wall 64 on a cross-section taken along a line in parallel with a longitudinal center plane of the vehicle 1 (i.e., a vertical plane passing through the center between the left and right wheels of the vehicle 1 that is travelling straight) will be described in detail.

First, a virtual straight line extending from an upper end 32a of the reflective surface to a first wall 63, more specifically, the center portion of the first wall 63 in the width direction, is defined as an end reference first straight line L1. The width direction here means a direction perpendicular to the extending direction of the wall. Next, an angle formed by the first wall 63 with respect to the end reference first straight line L1 is defined as an end reference first wall angle $\alpha e$ formed on a side of the first wall 63 opposite to the upper end 32a of the reflective surface. The angle $\alpha e$ is an angle that has a positive value when formed on an upper area side (or an exposed side) with respect to the end reference first straight line L1 and is negative when formed on an lower area side (i.e., a side opposite to the exposed side) with respect to the end reference first straight line L1 (see also FIGS. 9 and 10 to define a negative or positive value of the angle $\alpha e$).

Then, a virtual straight line extending from a lower end 32b of the reflective surface to a second wall 64 (more specifically, the center portion of the second wall 64 in the width direction) is defined as an end reference second straight line L2. Next, an angle formed by the second wall 64 with respect to the end reference second straight line L2 is defined as an end reference second wall angle $\beta e$ formed on a side of the second wall 64 opposite to the lower end 32b of the reflective surface. The angle $\beta e$ is an angle that has a positive value when formed on an upper side with respect to the end reference second straight line L2 and has a negative value when formed on an lower side with respect to the end reference second straight line L2 (see also FIGS. 9 and 10 to define a negative or positive value of the angle $\beta e$).

Here, an upper side of the portion 61a with respect to the end reference first straight line L1 or the end reference second straight line L2 is also referred to as an exposed side of the portion 61a because the portion 61a of the surface is exposed upward. Further, since the ceiling wall 54, which is a base of the portion 61a of the surface, is located in a lower side of the portion 61a with respect to the end reference first straight line L1 or the end reference second straight line L2, the lower side is also referred to as a side opposite to the exposed side.

Figure 3:
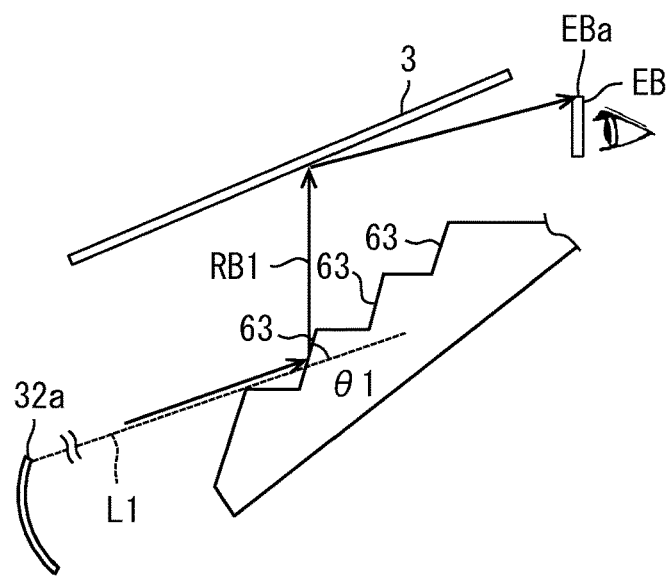
FIG. 3 is a diagram for explaining a visible area first critical angle of the first embodiment.

Next, an angle θ1 shown in FIG. 3 is defined. An angle formed by the first wall 63 with respect to the end reference first straight line L1 is defined as a visual area first critical angle θ1 that is formed on a side of the first wall 63 opposite to the upper end 32a. The angle θ1 is an angle that is positive when formed on an upper side with respect to the end reference first straight line L1 and is negative when formed on an lower side with respect to the end reference first straight line L1 (see also FIGS. 9 and 10 to define a negative or positive value of the angle θ1). The angle θ1 is virtually set such that a virtual light RB1 travelling along the end reference first straight line L1 from the upper end 32a of the reflective surface and incident on the first wall 63 reaches an upper end EBa of the visible area EB after reflected by the first wall 63.

Figure 4:
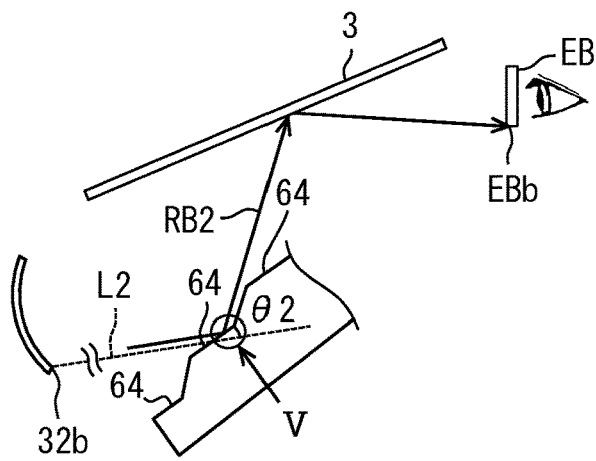
FIG. 4 is a diagram for explaining a visible area second critical angle of the first embodiment.
Figure 5:
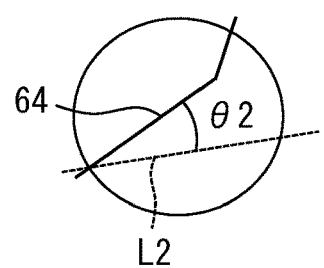
FIG. 5 is an enlarged view of portion V of FIG. 4.

Next, an angle θ2 shown in FIGS. 4 and 5 is defined. An angle formed by the second wall 64 with respect to the end reference second straight line L2 is defined as a visual area second critical angle θ2 that is formed on a side of the second wall 64 opposite to the lower end 32b of the reflective surface. The angle θ2 is an angle that is positive when formed on an upper side with respect to the end reference second straight line L2 and is negative when formed on an lower side with respect to the end reference second straight line L2 (see also FIGS. 9 and 10 to define a negative or positive value of the angle θ2). The angle θ2 is virtually set such that a virtual light RB2 travelling along the end reference second straight line L2 from the lower end 32b of the reflective surface and incident on the second wall 64 reaches a lower end EBb of the visible area EB after reflected by the second wall 64.

Then, a relationship $\alpha e > \beta e$ is established as a first relationship for each pair of the first wall 63 and the second wall 64 which are adjacent to each other in the present embodiment. Further, a relationship $\alpha e > \theta 1$ is established as a second relationship for each first wall 63. Further, a relationship $\beta e < \theta 2$ is established as a third relationship for each second wall 64. By simultaneously satisfying the above-described first, second, and third relationships, the external light that reaches the portion 61a from the reflective surface 32 of the concave mirror 31 is reflected further upward of the upper end EBa of the visible area EB even when reflected by the first wall 63. Further, even when the external light is reflected by the second wall 64, the external light reaches an area further below the lower end EBb of the visible area EB. Therefore, it is possible to prevent the external light reflected by the reflective surface 32 from reaching an inside region of the visible area EB.

Figure 6:
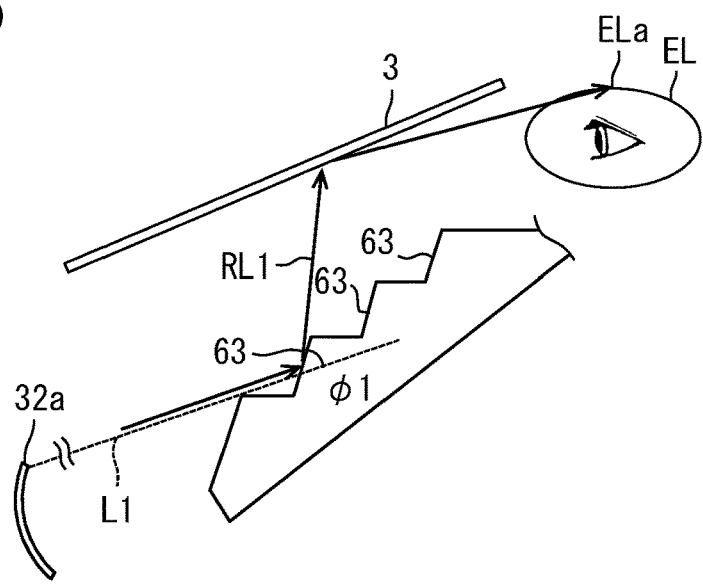
FIG. 6 is a diagram for explaining an eyelips first critical angle of the first embodiment.

Next, an angle φ1 shown in FIG. 6 is defined. An angle formed by the first wall 63 with respect to the end reference first straight line L1 is defined as an eyelips first critical angle φ1 that is formed on a side of the first wall 63 opposite to the upper end 32a of the reflective surface. The angle φ1 is an angle that is positive when formed on an upper side with respect to the end reference first straight line L1 and is negative when formed on a lower side with respect to the end reference first straight line L1 (see also FIGS. 9 and 10 to define a negative or positive value of the angle φ1). The angle φ1 is virtually set such that a virtual light RL1 travelling along the end reference first straight line L1 from the upper end 32a of the reflective surface and incident on the first wall 63 reaches an upper end ELa of the eyelips EL after reflected by the first wall 63.

Figure 7:
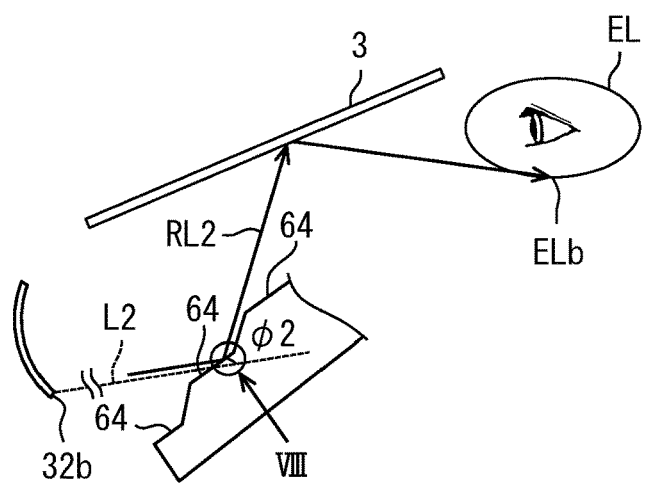
FIG. 7 is a diagram for explaining an eyelips second critical angle of the first embodiment.
Figure 8:
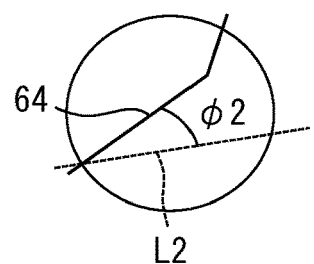
FIG. 8 is an enlarged view of portion VII of FIG. 7.

Next, an angle φ2 is defined as shown in FIGS. 7 and 8. An angle formed by the second wall 64 with respect to the end reference second straight line L2 is defined as an eyelips second critical angle φ2 that is formed on a side of the second wall 64 opposite to the lower end 32b of the reflective surface. The angle φ2 is an angle that is positive when formed on an upper side with respect to the end reference second straight line L2 and is negative when formed on a lower side with respect to the end reference second straight line L2 (see also FIGS. 9 and 10 to define a negative or positive value of the angle φ2). The angle φ2 is virtually set such that a virtual light RL2 travelling along the end reference second straight line L2 from the lower end 32b of the reflective surface and incident on the second wall 64 reaches a lower end ELb of the eyelips EL after reflected by the second wall 64.

Then, a relationship $\alpha e > \varphi 1$ is established as a fourth relationship for each first wall 63 and each second wall 64 in the present embodiment. Furthermore, $\beta e < \varphi 2$ is established as a fifth relationship. By simultaneously satisfying the above-described first, fourth, and fifth relationships, the external light that reaches the portion 61a from the reflective surface 33 of the concave mirror 31 is reflected further upward of the upper end ELa of the eyelips EL even when reflected by the first wall 63. Further, even when the external light is reflected by the second wall 64, the external light reaches an area further below the lower end ELb of the eyelips EL. Therefore, it is possible to prevent the external light reflected by the reflective surface 32 from reaching an inside region of the eyelips EL.

Figure 9:
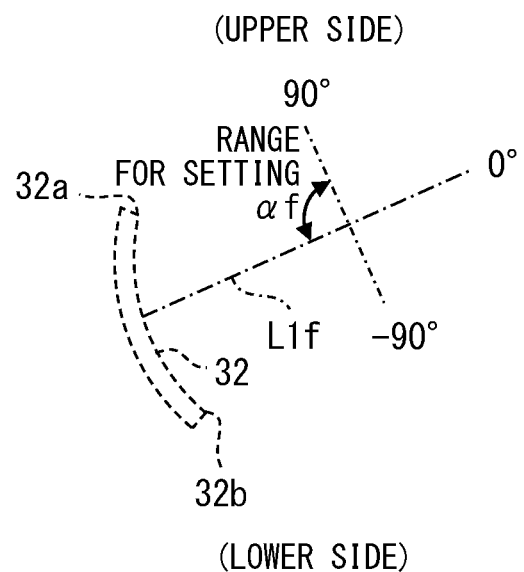
FIG. 9 is a diagram for explaining a definition of an angle according to the first embodiment.

Here, apart from the end reference first straight line L1, a predetermined point reference first straight line L1f shown in FIG. 9 is defined. The predetermined point reference first straight line L1f is a virtual straight line extending from a first predetermined point on the reflective surface 32 to a first wall 63 (more specifically, a center portion in the width direction of the first wall 63). Next, an angle formed by the first wall 63 with respect to the predetermined point reference first straight line L1f is defined as a predetermined point reference first wall angle αf that is formed on a side of the first wall 63 opposite to the upper end 32a of the reflective surface. The angle αf is an angle that is positive when formed on an upper side with respect to the predetermined point reference first straight line L1f and is negative when formed on a lower side with respect to the predetermined point reference first straight line L1f.

Then, for each first wall 63, at least one first predetermined point exists on the reflective surface 32 so that the angle αf is formed within a range of 90°<αf<180°. The at least one first predetermined point may exist at any place on the reflective surface 32. The point may be different for each first wall 63.

In particular, in the present embodiment, the angle αf defined by taking an arbitrary point on the reflective surface 32 as the first predetermined point is set to satisfy 90°<αf<180°. However, when an arbitrary point is virtually gradually moved from the upper end 32a of the reflective surface to the lower end 32b of the reflective surface, the angle αf usually does not have a discrete value and does not have an extreme value. Therefore, if the predetermined point reference first straight line L1f is defined by taking the upper end 32a of the reflective surface as the first predetermined reference point and the angle αf falls within the range of 90°<αf<180°, and if the predetermined point reference first straight line L1f is defined by taking the lower end 32b of the reflective surface as the first predetermined reference point and the angle αf falls within the range of 90°<αf<180°, any arbitrary point is deemed to satisfy the condition.

Figure 10:
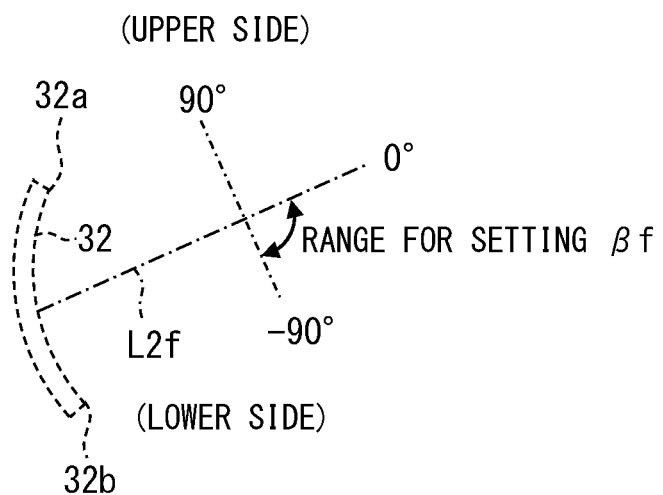
FIG. 10 is a diagram for explaining a definition of an angle according to the first embodiment.

Here, apart from the end reference second straight line L2, a predetermined point reference second straight line L2f shown in FIG. 10 is defined. The predetermined point reference second straight line L2f is a virtual straight line extending from a second predetermined point on the reflective surface 32 to a second wall 64 (more specifically, a center portion in the width direction of the second wall 64). Next, an angle formed by the second wall 64 with respect to the predetermined point reference second straight line L2f is defined as a predetermined point reference second wall angle βf that is formed on a side of the second wall 64 opposite to the upper end 32a of the reflective surface. The angle βf is an angle that is positive when formed on an upper side with respect to the predetermined point reference second straight line L2f and is negative when formed on a lower side with respect to the predetermined point reference second straight line L2f.

Then, for each second wall 64, at least one second predetermined point exists on the reflective surface 32 such that the angle βf is formed within a range of −90°<βf<0°. The at least one second predetermined point may exist at any place on the reflective surface 32. The point may be different for each second wall 64.

In particular, in the present embodiment, the angle βf defined by taking an arbitrary point on the reflective surface 32 as the second predetermined point is set to satisfy −90°<βf<0°. However, when an arbitrary point is virtually gradually moved from the upper end 32a of the reflective surface to the lower end 32b of the reflective surface, the angle βf usually does not have a discrete value and does not have an extreme value. Therefore, if the predetermined point reference second straight line L2f is defined by taking the upper end 32a of the reflective surface as the second predetermined reference point and the angle βf falls within the range of −90°<βf<0°, and if the predetermined point reference second straight line L2f is defined by taking the lower end 32b of the reflective surface as the second predetermined reference point and the angle βf falls within the range of −90°<βf<0°, any arbitrary point is deemed to satisfy the condition.

Figure 11:
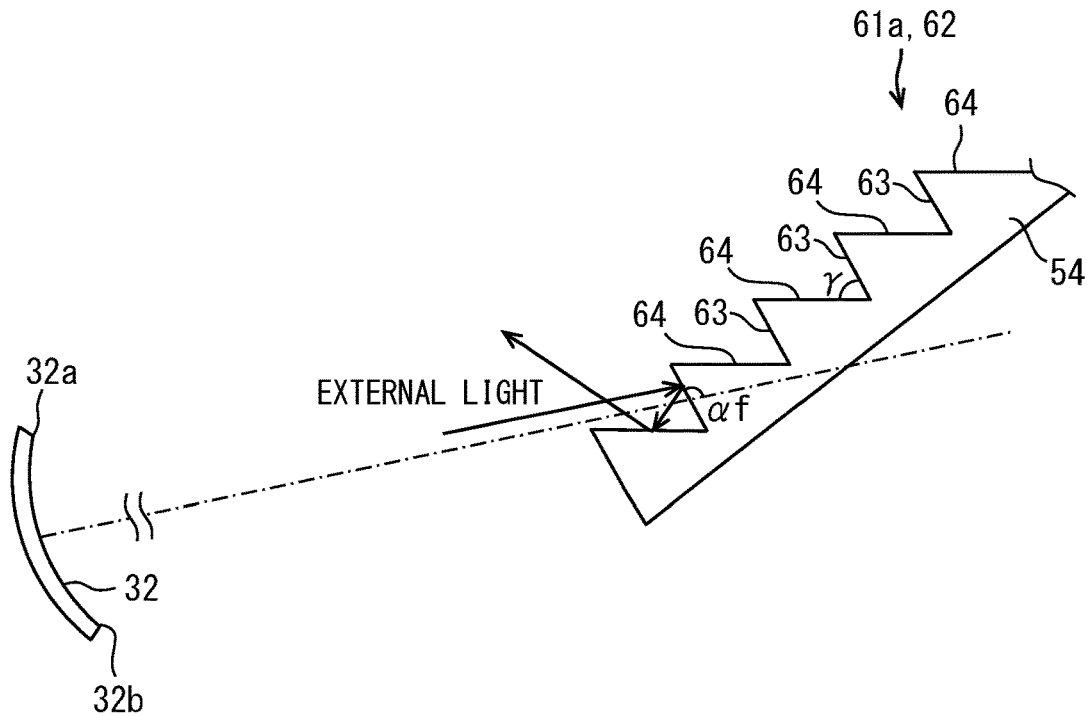
FIG. 11 is a diagram for explaining that external light reflected by the first wall reaches the second wall in the first embodiment.

As shown in FIG. 11, the first wall 63 and the second wall 64 are connected to each other so as to form an acute angle γ at a valley portion on the exposed side (in other words, the outer side of the housing 51). Then, in the wall structure 62 disposed on the portion 61a, when the external light that is reflected by the reflective surface 32 of the concave mirror 31 and reaches the first wall 63 is further reflected by the first wall 63, the external light reaches the second wall 64 that is adjacent to the first wall 63 at a position close to the reflective surface 32 and that forms the acute angle γ. Further, the external light reflected by the reflective surface 32 does not directly enter the second wall 64 due to setting of βf within the above-described range.

Further, in the wall structure 62, each first wall 63 is formed to have substantially the same gradient, and each second wall 64 is formed to have substantially the same gradient. The physical quantity described as "gradient" in the present embodiment is defined as the degree of inclination of each of the wall surfaces 63 and 64 in the coordinate system with respect to the vehicle 1 on a horizontal surface.

On the other hand, the physical quantities described as "angles" such as αe, αf, βe, θ1, θ2, φ1, φ2 are defined based on the end reference first straight line L1 or the end reference second straight line L2 that have different definitions corresponding to relative positions of the first wall surface 63 and the second wall surface 64 with respect to the reflective surface 32. Therefore, it should be noted that even if the same angle αe is set for each of the first walls 63, since each reference line of the angle corresponding to the respective first wall 63 is different from each other, gradients are not the same. The same applies to the angle βe to the second wall 64.

Further, in the present embodiment, the upper end 32a of the reflective surface corresponds to "one end of the reflective surface", and the lower end 32b of the reflective surface corresponds to "the other end of the reflective surface". The "one end of the reflective surface" and the "other end of the reflective surface" are positioned so as to face each other across the reflective surface. If the mirror-shaped reflective surface 32 is formed up to the edge of the concave mirror 31, the upper end 32a of the reflective surface and the lower end 32b of the reflective surface substantially match the upper end and the lower end of the concave mirror 31. If the mirror-shaped reflective surface 32 is surrounded by an outer frame made of, for example, a light-shielding synthetic resin, the upper end of the mirror-shaped portion without the outer frame is the upper end 32a of the reflective surface, and the lower end is the lower end 32b of the mirror-shaped reflective surface.

Further, in the present embodiment, the upper end EBa of the visual recognition area corresponds to "one end of the visual recognition area", and the lower end EBb of the visual recognition area corresponds to "the other end of the visual recognition area". The "one end of the visual recognition area" and the "other end of the visual recognition area" are arranged so as to face each other across the visual recognition area.

In addition, in the present embodiment, the upper end ELa of the eyelips corresponds to "one end of the eyelips", and the lower end ELb of the eyelips corresponds to "the other end of the eyelips". The "one end of the eyelips" and the "other end of the eyelips" are arranged so as to face each other across the eyelips.

Operation and Advantages

Operation effects of the first embodiment as described above will be described below.

According to the first embodiment, the housing 51 is provided with the wall structure 62 having the first walls 63 and the second walls 64 that are alternately connected to each other one by one. The wall structure 62 is formed on the portion 61a that is a portion of the surface of the housing 51 where external light enters the housing 51 through the opening 53 from an outside and is reflected toward, and arrives, the reflective surface 32 of the concave mirror 31. Therefore, it is possible to prevent, due to the wall structure 62, the external light that has reached the wall structure 62 after reflected by the reflective surface 32 from secondarily reaching eyes of the viewer of the virtual image. Specifically, since the first wall 63 and the second wall 64 face in the different directions D1 and D2, external light is reflected by the first wall 63 and the second wall 64 in different directions. Thus, all secondary reflected light is prevented from reaching eyes of the viewer. Therefore, it is possible to prevent eyes of the viewer from being dazzled by the external light.

Further, the first walls 63 and the second walls 64 are arranged along the surface of the housing 51. Therefore, it is possible to avoid a situation where the top of the structure 62 significantly protrudes and interferes with the display optical path OP of the display light emitted from the display 11. Accordingly, the display light can sufficiently reach the eyes of the viewer and can be imaged as a virtual image. As described above, it is possible to provide the HUD device 10 having excellent visibility of the virtual image.

Further, according to the first embodiment, the end reference first wall surface angle αe is larger than the end reference second wall surface angle βe, and the end reference first wall surface angle αe is larger than the visual region first critical angle θ1. Moreover, the end reference second wall surface angle βe is smaller than the visual region second critical angle θ2. By satisfying such conditions, the reflected light, which is external light having reached from the reflective surface 32, and reflected by, the wall structure 62, is less likely to reach an inside region of the visible area EB. Therefore, it is possible to prevent the external light from secondarily reaching the eyes of the viewer at the same time of recognizing the virtual image. Therefore, it is possible to prevent eyes of the viewer from being dazzled by the external light when recognizing the virtual image and thus the visibility of the virtual image can be improved.

Further, according to the first embodiment, the end reference first wall surface angle αe is larger than the end reference second wall surface angle βe, and the end reference first wall surface angle αe is larger than the eyelips first critical angle φ1. Moreover, the end reference second wall surface angle βe is smaller than the eyelips second critical angle φ2. By satisfying such conditions, the reflected light, which is external light having reached from the reflective surface 32, and reflected by, the wall structure 62, is less likely to reach an inside region of the eyelips EL. Therefore, it is possible to prevent the external light from secondarily reaching the eyes of the viewer at the eye point EP which is set for the viewer. Therefore, it is possible to prevent eyes of the viewer from being dazzled by the external light and thus the visibility of the virtual image can be improved.

Further, according to the first embodiment, the predetermined point reference first wall surface angle αf is set to be larger than +90 degrees and smaller than +180 degrees. Accordingly, even if the external light reflected by the reflective surface 32 is further reflected by the first wall 63, the external light is likely to be reflected toward the second wall 64. Thus, the light can be prevented from reaching the eyes of the viewer.

Further, according to the first embodiment, the predetermined point reference second wall surface angle βf is set to be larger than −90 degrees and smaller than 0 degrees. Accordingly, it is possible to prevent the external light reflected by the reflective surface 32 from directly reaching the second wall 64.

Further, according to the first embodiment, when the external light reflected by the reflective surface 32 reaches, and is reflected by, the first wall 63, the external light reaches the second wall 64. Each time the external light is reflected, intensity decreases due to absorption by the material of the housing 51 or diffusion by the surface. Therefore, by reflecting the external light a plurality of times by the wall surface 62, intensity of the external light can be cumulatively reduced. Therefore, it is possible to prevent eyes of the viewer from being dazzled by the external light when recognizing the virtual image and thus the visibility of the virtual image can be improved.

Further, according to the first embodiment, the wall structure 62 is provided on the portion 61a of the surface of the housing 51 that faces the windshield 3. By controlling the reflecting direction by the wall structure 62 on the portion 61a, it is possible to prevent the secondary reflected light from entering the windshield 3. As a result, it is possible to prevent the secondarily reflected light from reaching the eyes of the viewer.

Further, according to the first embodiment, the wall structure 62 is provided at the portion 61a that is exposed to an outside of the housing 51 and that faces the windshield 3. Since the wall structure 62 extends along the surface, it is possible to prevent not only the secondarily reflected light from reaching the eye, but also the housing 51 from interfering with the display optical path OP at a position outside of the housing 51. That is, since the freedom in designing the display optical path OP of the display light emitted from the opening 53 to an outside is improved, high visibility of the virtual image can be easily realized.

Second Embodiment

Figure 12:
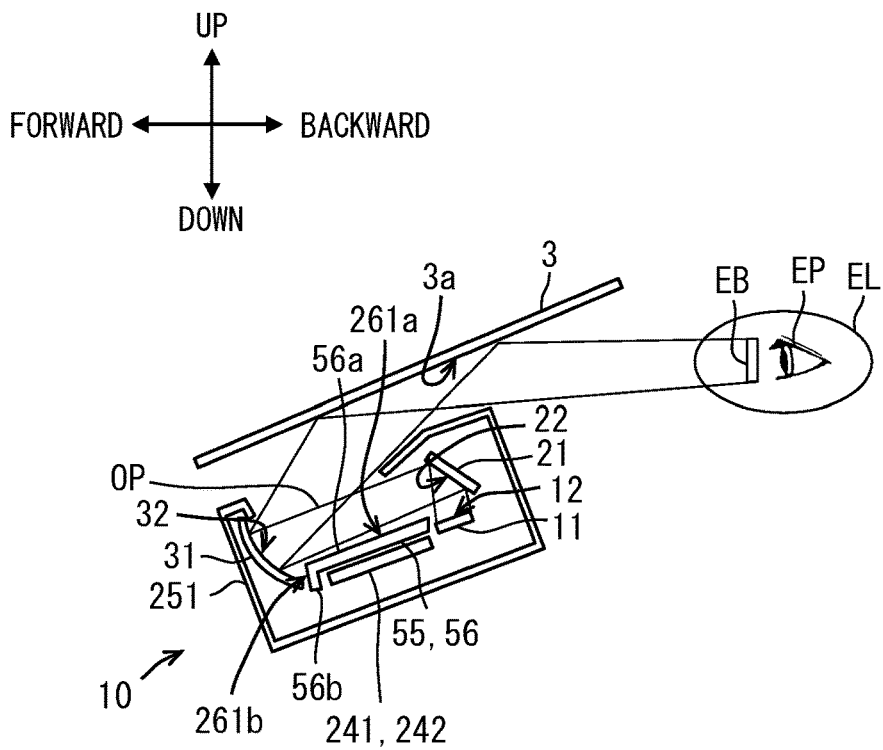
FIG. 12 is a diagram corresponding to FIG. 4 in a second embodiment.
Figure 13:
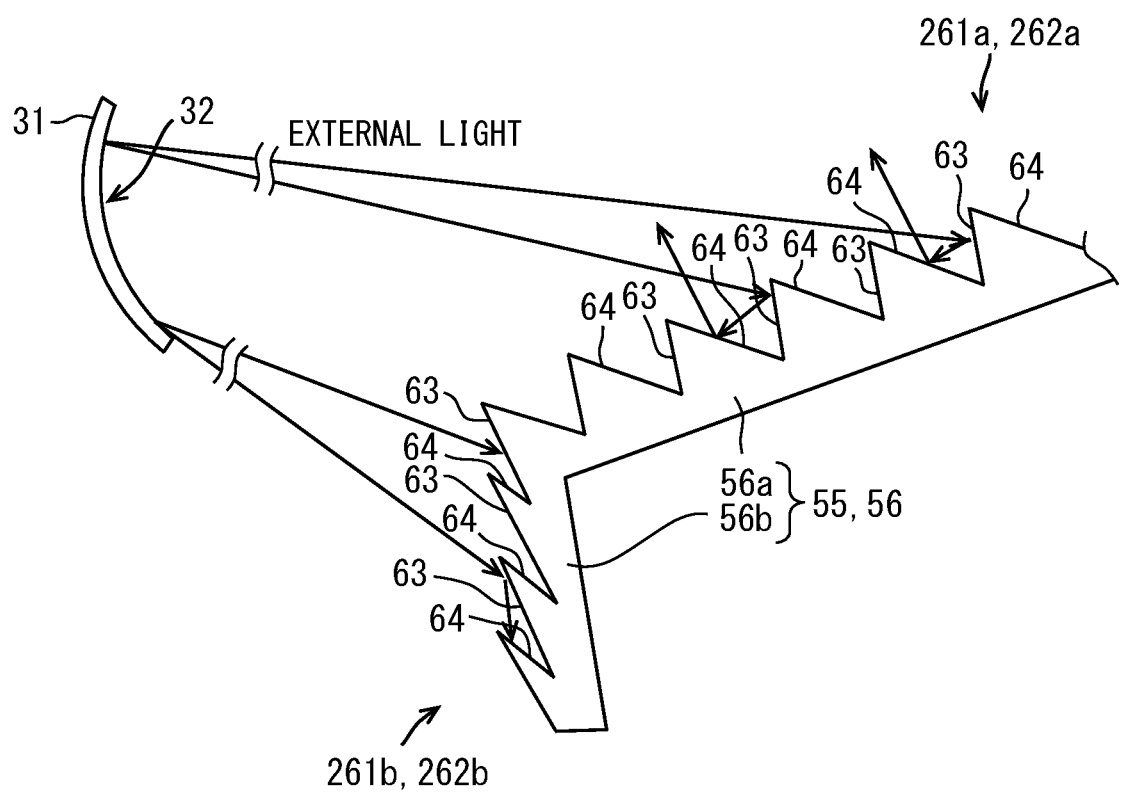
FIG. 13 is an enlarged view showing a wall structure of the second embodiment.

As shown in FIGS. 12 and 13, a second embodiment is a modification to the first embodiment. The second embodiment will be described focusing on matters different from the first embodiment.

As shown in FIG. 12, the control circuit 242 of the control unit 241 according to the second embodiment is housed in the housing 251 and is disposed in a space between the display 11 and the concave mirror 31.

Correspondingly, the housing 251 of the second embodiment has a partition 55 that separates the control circuit 242 from the concave mirror 31 in the housing 251. The partition 55 has a partition plate 56 formed in a substantially plate shape.

The partition plate 56 has a parallel portion 56a and a bent portion 56b. The parallel portion 56a extends under, and in substantially parallel with, the display optical path OP between the plane mirror 21 and the concave mirror 31. The bent portion 56b is arranged at the foremost position of the partition plate 56, and is formed by being bent downward with respect to the parallel portion 56a.

The area of the surface composed of the partition plate 56 includes a portion 261a and a portion 261b. The portion 261a protrudes upward from the parallel portion 56a and faces the windshield 3 through the opening 53. The portion 261b protrudes backward from the bent portion 56b and faces the concave mirror 31.

An external light reflected on the reflective surface 32 of the concave mirror 31 reaches the portions 261a, 261b. For example, an external light such as sunlight passes through the windshield 3, which is disposed outside of the housing 251, at a position slightly offset frontward from the portion of the windshield 3 on which the display light is projected, and then the external light travels in a downward direction. Such external light enters the housing 251 through the opening 53 and is reflected by the reflective surface 32 of the concave mirror 31. Then, since the reflection angle of the external light on the reflective surface 32 is larger than the reflection angle of the display light, the external light reaches the portions 261a, 261b that are located slightly offset downward from the display optical path OP between the plane mirror 21 and the concave mirror 31.

Therefore, in the second embodiment, as shown in FIG. 13, the portion 261a is provided with the wall structure 262a for controlling the reflecting direction, and the portion 261b is provided with another wall structure 262b for controlling the reflecting direction. In the wall structures 262a and 262b, the angles of the first wall 63 and the second wall 64 are set so as to satisfy the same relationships as described in the first embodiment. However, since the position of the wall structure 262a relative to the concave mirror 31 is different from the wall structure 262b, their shapes can be observed differently.

According to the second embodiment described above, the wall structure 262a is provided, in the housing 25, on the portion 261a facing the windshield 3 through the opening 531. Since the wall structure 262a extends along the surface, it is possible to prevent not only the secondarily reflected light from reaching the eyes, but also the housing 251 from interfering with the display optical path OP in the housing 251. That is, since the degree of freedom in arranging members, such as the display 11 and the concave mirror 31, in the housing 251 is improved, high visibility of the virtual image can be easily realized.

Third Embodiment

As shown in FIGS. 14 to 19, a third embodiment is a modification to the second embodiment. The third embodiment will be described mainly on configurations different from those of the second embodiment.

In the third embodiment, the wall structure 362 having the first walls 63 and the second walls 64 that are alternately connected to each other one by one is disposed on a portion 361a of the surface that is exposed to an inside of the housing 351 so as to face in the left direction. The portion 361a is formed by a side wall 57 of the housing 351.

Figure 14:
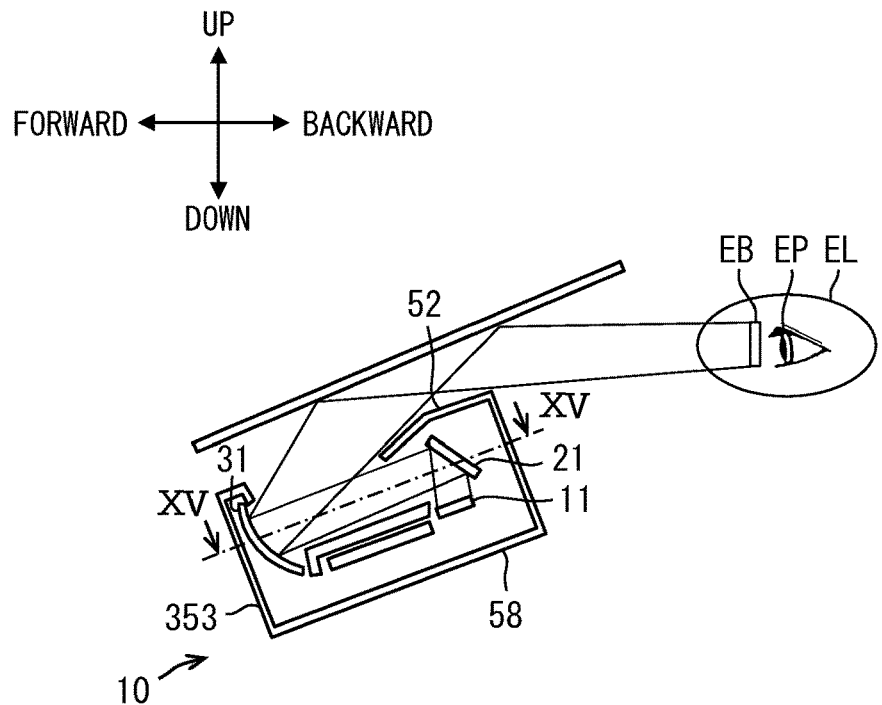
FIG. 14 is a diagram corresponding to FIG. 3 in a third embodiment.
Figure 15:
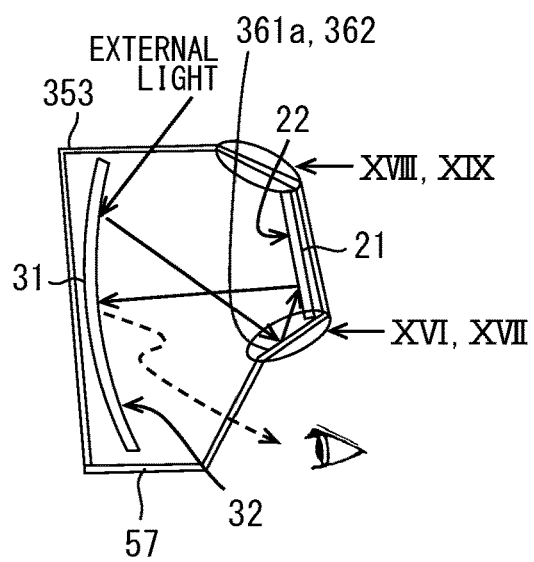
FIG. 15 is a cross-sectional view showing XV-XV cross-section of FIG. 14.
Figure 16:
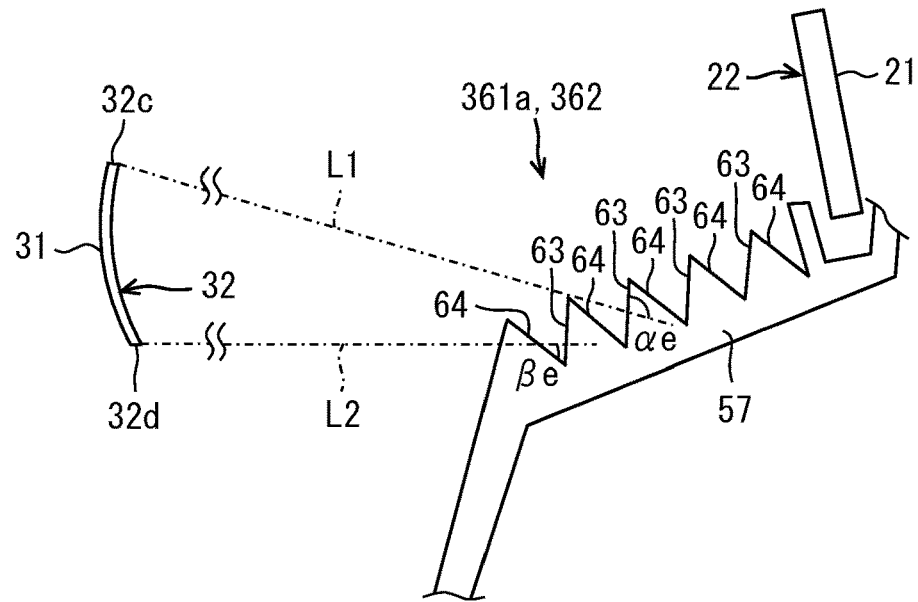
FIG. 16 is an enlarged view of portion XVI of FIG. 15 and is a diagram for explaining an end reference first wall angle and an end reference second wall angle.
Figure 17:
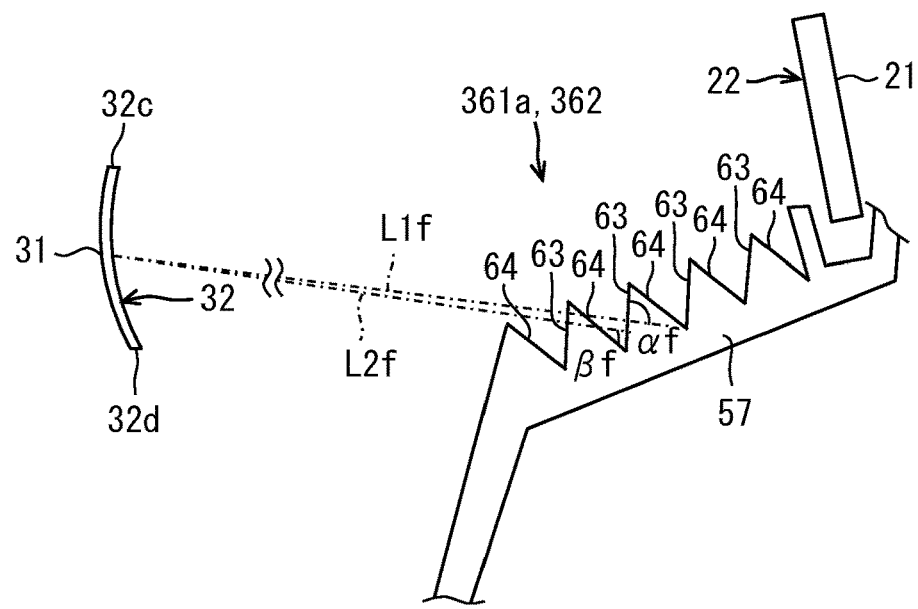
FIG. 17 is an enlarged view showing portion XVII of FIG. 15 and is a diagram for explaining a predetermined point reference first wall surface angle and a predetermined point reference second wall surface angle.
Figure 18:
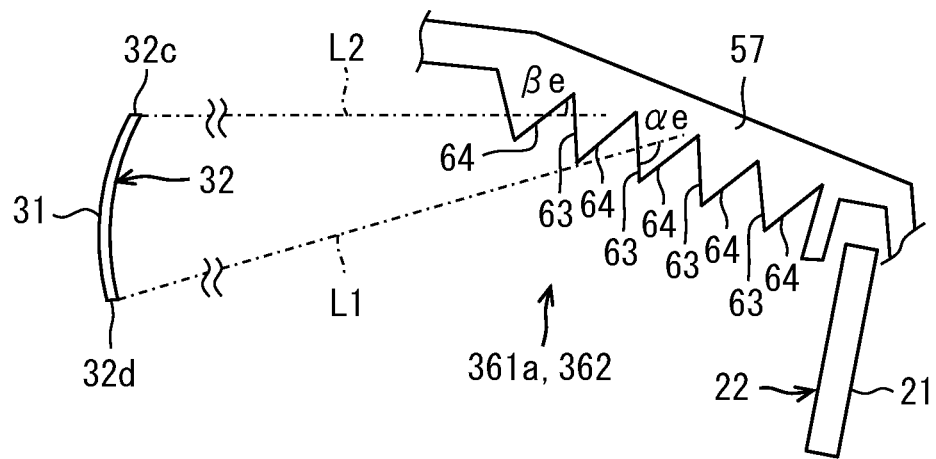
FIG. 18 is an enlarged view of portion XVIII of FIG. 15 and is a diagram for explaining an end reference first wall angle and an end reference second wall angle.
Figure 19:
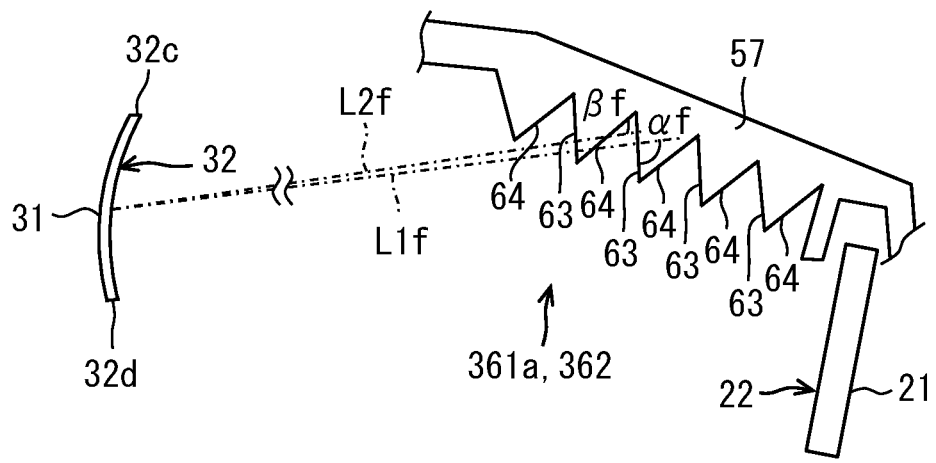
FIG. 19 is an enlarged view showing portion XIX of FIG. 15 and is a diagram for explaining a predetermined point reference first wall surface angle and a predetermined point reference second wall surface angle.

As shown in FIGS. 14 and 15, the side wall 57 is formed in a plate shape that extends in a direction substantially perpendicular to the bottom portion 58 and the ceiling portion 52. Further, the portion 361a extends in an oblique direction with respect to the reflective surface 22 of the plane mirror 21 and is disposed at a position adjacent to the plane mirror 21. In particular, in the present embodiment, two portions 361a are formed on both the left side and the right side of the plane mirror 21.

The external light reflected on the reflective surface 32 of the concave mirror 31 reaches the portions 361a. For example, external light such as sunlight obliquely entering the vehicle 1 in the early morning or evening travels into the housing 351 through the opening 53 and is reflected by the reflective surface 32 of the concave mirror 31. Then, such external light may reach the portions 361a. The external light is reflected by the portions 361a, is reflected by the plane mirror 21, is further reflected by the concave mirror 31, and is reflected by the windshield 3. Then, the light may reach the visible area EB or the eyelips EL.

In the wall structures 362 provided on the portions 361a, each of the first walls 63 and each of the second walls 64 have an elongated stripe shape extending in the vertical direction, as shown in FIGS. 16 to 19. Since the extending direction is different from that of the first embodiment, the definitions of angles such as αe, αf, βe, βf, θ1, θ2, φ1, and φ2 are also defined on the horizontal plane of the vehicle 1 instead of on the cross-section of the vehicle 1 in parallel with the longitudinal center plane. Further, the "upper end 32a of the reflective surface" and "upper" are replaced with the "left end 32c of the reflective surface" and "left", and "the lower end 32b of the reflective surface" and "lower" are replaced with "the right end 32d of the reflective surface" and "right". It can be understood by reversing the left and right depending on the relationship with the reflecting direction of external light. As described above, the cross-section on which the angle is defined is not necessarily limited to the vertical surface, and can be understood as a cross-section including a connecting direction of the first wall 63 and the second wall 64.

According to the third embodiment described above, the wall surfaces 362 are provided on the portions 361a formed by the side wall 57 in the surface. By controlling the reflecting direction at the portions 361a, the effect of preventing the secondary reflected light from reaching the eyes of the viewer can be improved.

Fourth Embodiment

Figure 20:
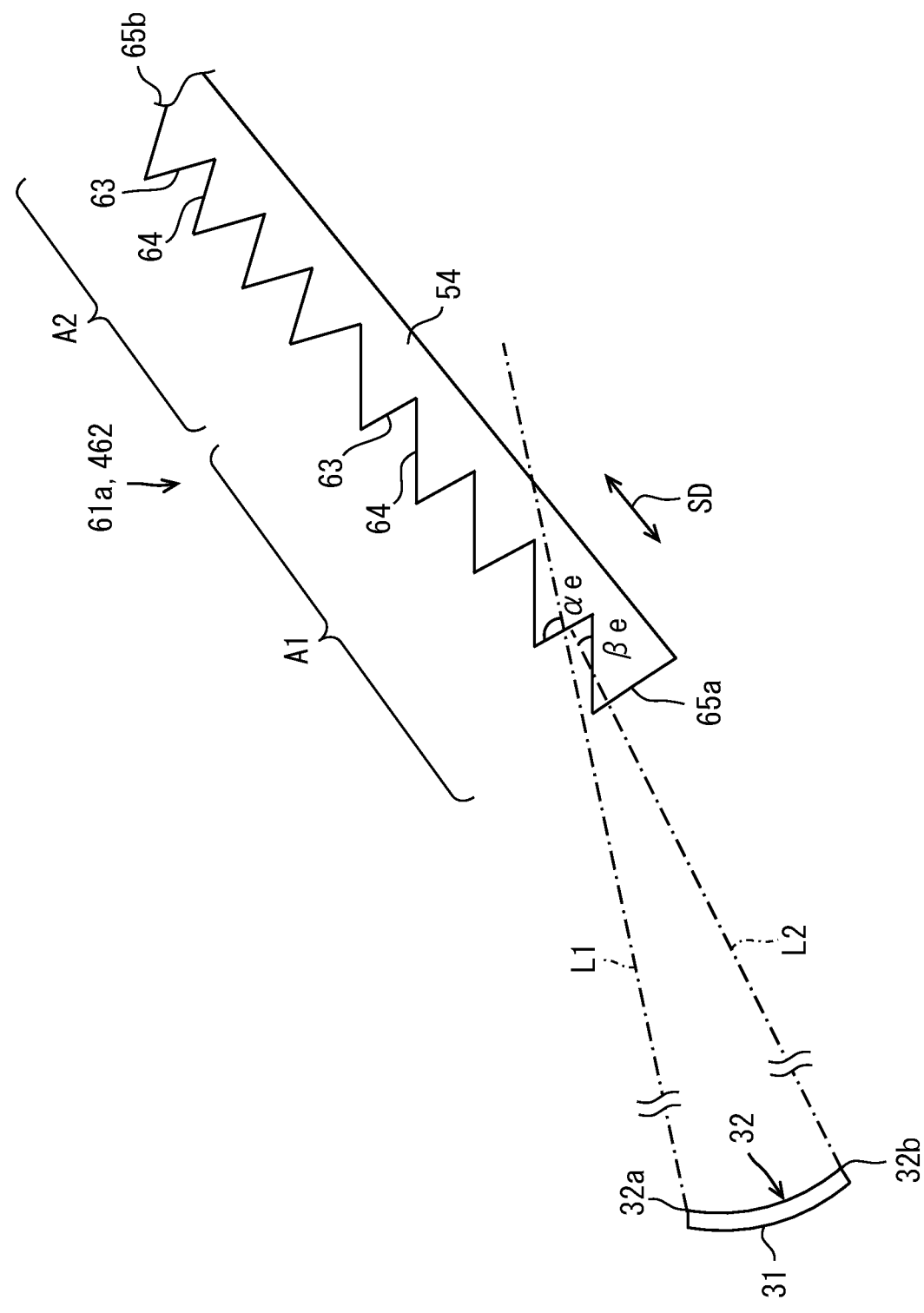
FIG. 20 is an enlarged view showing a wall structure of a fourth embodiment.

As shown in FIG. 20, a fourth embodiment is a modification to the first embodiment. The fourth embodiment will be described focusing on configurations different from the first embodiment.

At least one of the gradient of the first wall 63 and the gradient of the second wall 64 in the wall structure 462 that are formed on the portion 61a of the fourth embodiment gradually changes from one end 65a to the other end 65b of the wall structure 462 along a connecting direction SD. The connecting direction SD is a direction in which the first walls 63 and the second walls 64 are alternately connected to each other one by one. Further, "gradual change" referred to here includes a slope-like change that changes little by little for each wall, in addition to a step-like change for each area described below.

In particular, in the present embodiment, the wall structure 462 includes a plurality of different gradient regions A1 and A2 having different gradients of the first and second walls. The plurality of different gradient regions A1 and A2 are arranged to be offset from each other in the connecting direction so as to divide the wall structure 462 in the connecting direction. In the present embodiment, the gradients of the first walls 63 and the gradients of the second walls 64 in the different gradient region A1 are different from the gradients of the first walls 63 and the gradients of the second walls 64, respectively, in the different gradient region A2.

According to the fourth embodiment described above, the gradients can be set more appropriately between the plurality of different gradient regions A1 and A2. Therefore, even when the portion 61a on which the wall structure 462 is formed exists close to the reflective surface 32 or the dimension in the connecting direction SD of the portion 61a is large, it is possible to enhance the effect of preventing the secondarily reflected light from reaching the eyes of the viewer by properly setting the gradients of the first walls 63 and the second walls 64 according to the relative relationship with the reflective surface 32.

Fifth Embodiment

Figure 21:
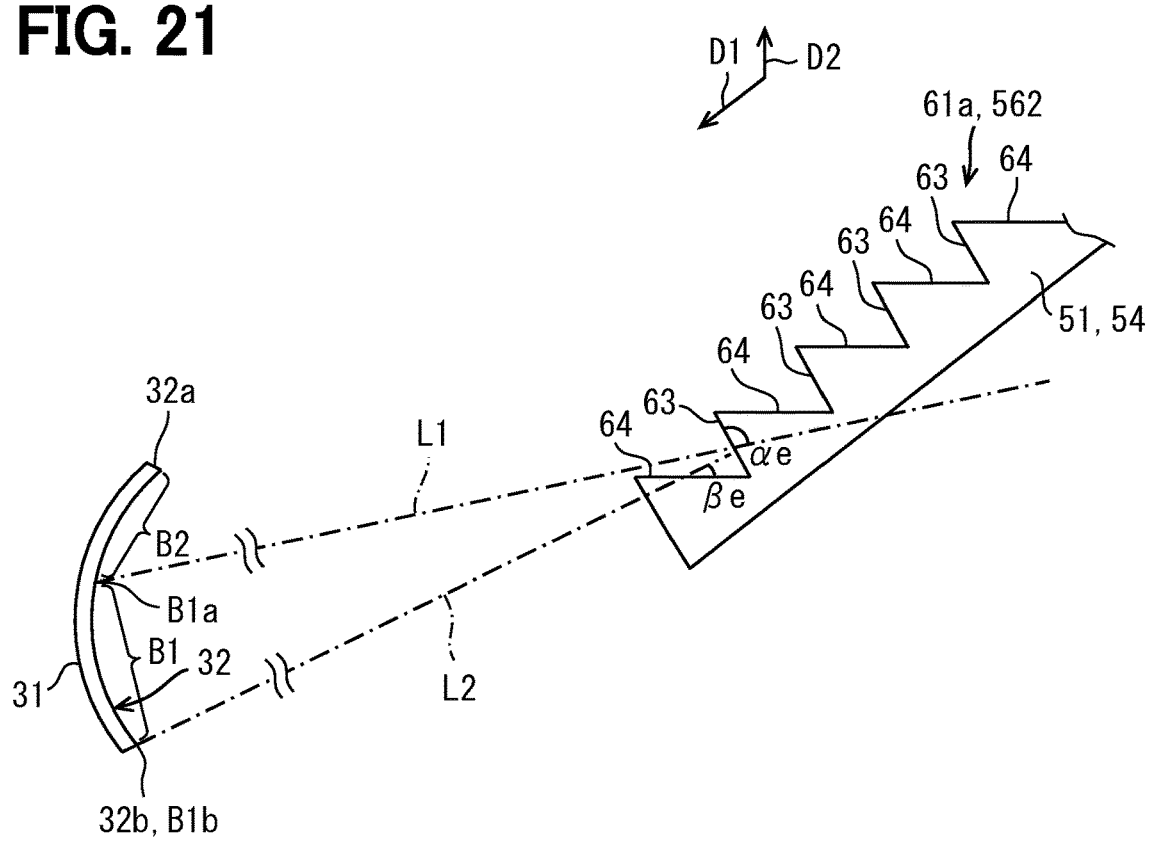
FIG. 21 is a diagram showing a relationship between a first condition satisfying region and a wall structure according to a fifth embodiment.
Figure 22:
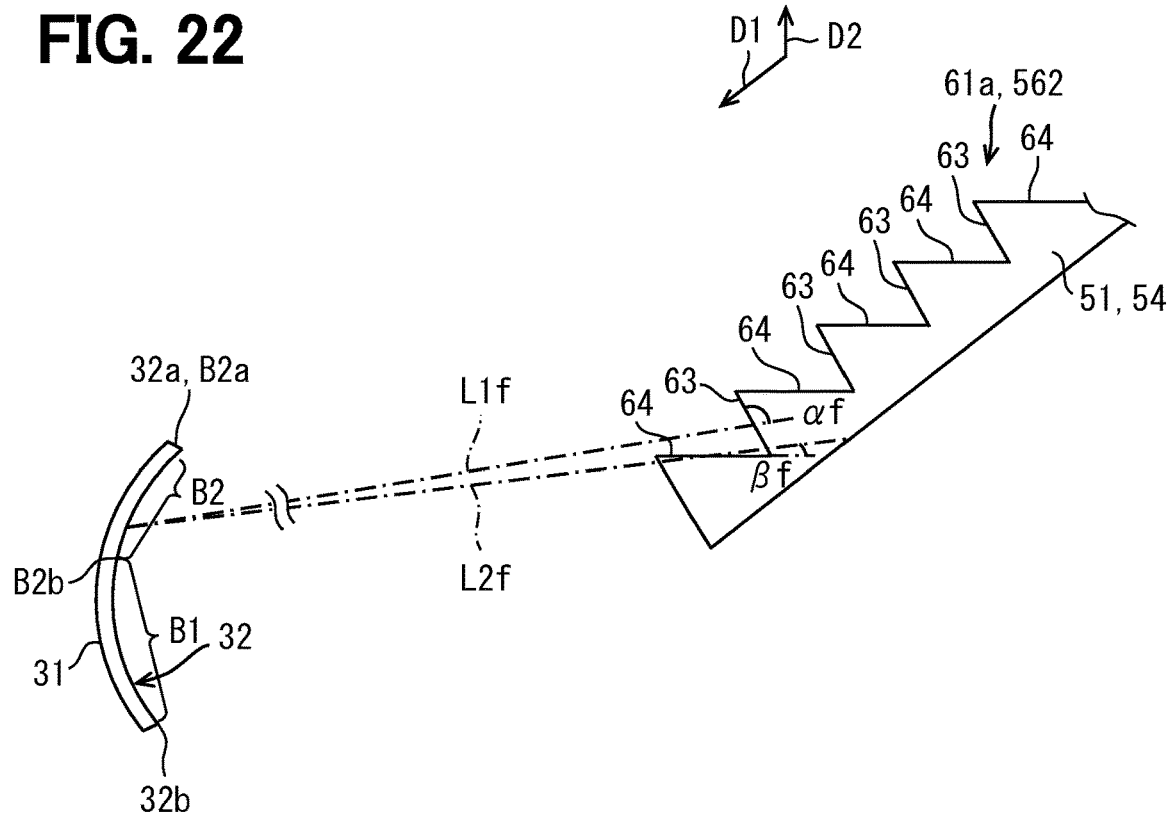
FIG. 22 is a diagram showing a relationship between a second condition satisfying region and the wall structure according to the fifth embodiment.

As shown in FIGS. 21 and 22, a fifth embodiment is a modification to the first embodiment. The fifth embodiment will be described focusing on configurations different from the first embodiment.

In the wall structure 562 provided in the portion 61a of the fifth embodiment, each pair of the first wall 63 and the second wall 64 adjacent to each other has an angular relationship slightly different from that of the first embodiment.

Specifically, the reflective surface 32 of the concave mirror 31 is virtually divided into two regions, a first condition satisfying region B1 and a second condition satisfying region B2. The first condition satisfying region B1 and the second condition satisfying region B2 may be commonly set for all the first walls 63 and the second walls 64 constituting the wall structure 562. Alternatively, the boundary between the first condition satisfying region B1 and the second condition satisfying region B2 may be individually and differently set for each pair of the first wall 63 and the second wall 64 that are adjacent to each other.

For example, the first condition satisfying region B1 is arranged closer to the lower end 32b of the reflective surface than the second condition satisfying region B2 in the reflective surface 32, and the second condition satisfying region B2 is arranged closer to the upper end 32a of the reflective surface than the first condition satisfying region B1 in the reflective surface 32. The reflective surface 32 is entirely occupied by the two regions B1 and B2.

Here, for one pair of the first wall 63 and the second wall 64 adjacent to each other, an angle of the first wall 63 and an angle of the second wall 64 on the cross-section of the vehicle 1 in parallel with the longitudinal center plane of the vehicle 1 will be described below in detail.

First, as shown in FIG. 21, a virtual straight line extending from an upper end B1a of the first condition satisfying region to a first wall 63, more specifically, the center portion of the first wall 63 in the width direction, is defined as an end reference first straight line L1. Next, an angle formed by the first wall 63 with respect to the end reference first straight line L1 is defined as an end reference first wall angle $\alpha e$ that is formed on side of the first wall 63 opposite to the upper end 32a of the reflective surface. The angle $\alpha e$ is an angle that is positive when formed on an upper side with respect to the end reference first straight line L1 and is negative when formed on a lower side with respect to the end reference first straight line L1 (see also FIGS. 9 and 10 to define a negative or positive value of the angle $\alpha e$).

Then, a virtual straight line extending from a lower end B1b of the first condition satisfying region to a second wall 64 (more specifically, the center portion of the second wall 64 in the width direction) is defined as an end reference second straight line L2. Next, an angle formed by the second wall 64 with respect to the end reference second straight line L2 is defined as an end reference second wall angle $\beta e$ that is formed on a side of the second wall 64 opposite to the lower end 32b of the reflective surface. The angle $\beta e$ is an angle that is positive when formed on an upper side with respect to the end reference second straight line L2 and is negative when formed on a lower side with respect to the end reference second straight line L2 (see also FIGS. 9 and 10 to define a negative or positive value of the angle $\beta e$).

Then, based on the straight lines L1 and L2 as defined, as with the first embodiment, the visual region first critical angle $\theta 1$, the visual region second critical angle $\theta 2$, the eyelips first critical angle $\varphi 1$, and the eyelips second critical angle $\varphi 2$ are defined.

Then, $\alpha e > \beta e$ is established, $\alpha e > \theta 1$ and $\beta e < \theta 2$ are established, and $\alpha e > \varphi 1$ and $\beta e < \varphi 2$ are established. That is, for the first condition satisfying region B1 which is a part of the reflective surface 32, the angle is set so as to prevent the external light reflected in the region B1 from reaching at least one of the visual recognition region and the eyelips.

Further, as shown in FIG. 22, apart from the end reference first straight line L1, a predetermined point reference first straight line L1f is defined. The predetermined point reference first straight line L1f is a virtual straight line extending from a first predetermined point on the second condition satisfying region B2 to a first wall 63 (more specifically, a center portion in the width direction of the first wall 63). For the straight line L1f as defined, the predetermined point reference first wall surface angle $\alpha f$ is defined as with the first embodiment.

Then, in the first wall 63 among the first wall 63 and the second wall 64 adjacent to each other, each predetermined point reference first wall angle $\alpha f$ defined by taking any arbitrary point on the second condition satisfying region B2 as the first predetermined point. is set to be larger than +90 degrees and smaller than +180 degrees. That is, the predetermined point reference first wall angle $\alpha f$ establishes the above relationship with respect to all points on the second condition satisfying region B2.

Further, apart from the end reference second straight line L2, a predetermined point reference second straight line L2f is defined. The predetermined point reference second straight line L2f is a virtual straight line extending from a second predetermined point on the second condition satisfying region B2 to a second wall 64 (more specifically, a center portion in the width direction of the second wall 64). For the straight line L2f as defined, the predetermined point reference second wall surface angle $\beta f$ is defined as with the first embodiment.

Then, in the second wall 64 among the first wall 63 and the second wall 64 adjacent to each other, each predetermined point reference second wall angle $\beta f$ defined by taking any arbitrary point on the second condition satisfying region B2 as the second predetermined point is set to be larger than −90 degrees and smaller than 0 degree (in other words, larger than +90 degrees and smaller than +180 degrees).

Therefore, for the second condition satisfying region B2 excluding the first condition satisfying region B1 on the reflective surface 32, the angle is set so that even if the external light reflected by the region B2 is reflected on the first wall 63, the external light is likely to be reflected toward the second wall 64. Furthermore, for the second condition satisfying region B2 excluding the first condition satisfying region B1 on the reflective surface 32, the angle is set so that the external light reflected by the region B2 is less likely to directly reach the second wall 64.

According to the fifth embodiment described above, the reflective surface 32 is divided into two regions B1 and B2, and the angle condition is set in each area B1 and B2 so that the eyes of the viewer are not easily dazzled by the external light by different mechanisms. Therefore, it is possible to easily improve the visibility of the virtual image regardless of the size of the area of the reflective surface 32.

Other Embodiments

Although multiple embodiments have been described above, the present disclosure is not construed as being limited to these embodiments, and can be applied to various embodiments and combinations within a scope that does not depart from the gist of the present disclosure.

Specifically, as a first modification to the first, fourth, and fifth embodiments, the wall structure 62 may be formed on a portion of the bottom portion 58 of the housing 51 that is exposed upward and faces the windshield 3 through the opening 3.

As a second modification, a combiner provided separately from the vehicle 1 may be used as a projection target on which the display light is projected.

Figure 23:
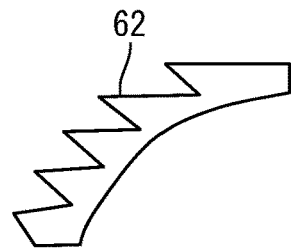
FIG. 23 is a diagram showing a specific example of a third modification.
Figure 24:
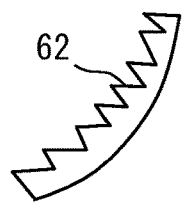
FIG. 24 is a diagram showing a specific example of the third modification.
Figure 25:
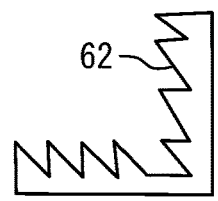
FIG. 25 is a diagram showing a specific example of the third modification.

As a third modification, the wall structure 62 can be applied to various shaped portions of the housing 51. As shown in FIG. 23, the wall structure 62 can be formed on the surface of a convex curved plate. As shown in FIG. 24, the wall structure 62 can be formed on the surface of a concave curved plate. As shown in FIG. 25, the wall structure 62 can be formed on the surface of a corner that is bent in a concave shape.

Figure 26:
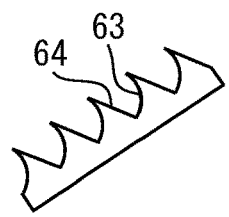
FIG. 26 is a diagram showing a specific example of a fourth modification.
Figure 27:
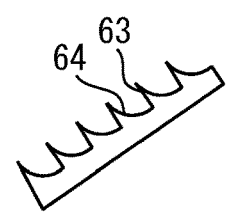
FIG. 27 is a diagram showing a specific example of the fourth modification.
Figure 28:
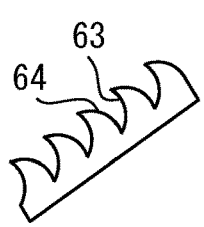
FIG. 28 is a diagram showing a specific example of the fourth modification.

As a fourth modification, at least one of the first wall 63 and the second wall 64 can be formed in a curved surface shape instead of a flat shape. In one example of FIG. 26, the second wall 64 is formed in a flat shape, while the first wall 63 is formed in a cylindrical surface shape curved in a concave shape. In one example of FIG. 27, the first wall 63 is formed in a flat shape, while the second wall 64 is formed in a cylindrical surface shape curved in a concave shape. In one example of FIG. 28, the first wall 63 is formed in a cylindrical surface shape curved in a concave shape, while the second wall 64 is formed in a cylindrical surface shape curved in a convex shape.

As a fifth modification, the wall structure 62 may be formed on a surface where external light reflected by the reflective surface 22 of the plane mirror 21 is expected to reach.

Figures 29, 30:
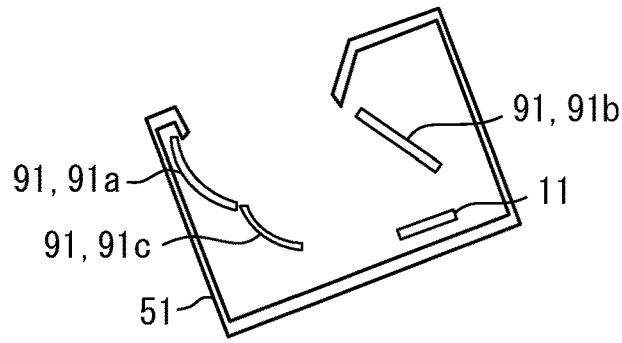
FIG. 29 is a diagram showing a sixth modification.
FIG. 30 is a table showing a combination of different types of reflective mirrors.

As a sixth modification, three or more reflective mirrors 91 may be provided as shown in FIG. 29. When the reflective mirrors are numbered with a first mirror 91a, a second mirror 91b, and a third mirror 91c from the opening 53 along the display optical path OP, various combinations of shapes for the mirrors shown in the table of FIG. 30 can be used.

As a seventh modification, the angles αe and βe may be set to satisfy the first, second, and third relationships but not the fourth and fifth relationships among the first to fifth relationships described in the first embodiment. Alternatively, the angles αe and βe may be set so as to satisfy the first, fourth and fifth relationships but not the second and third relationships.

As an eighth modification, the first wall 63 and the second wall 64 may be connected to each other so as to form an obtuse angle at the exposed valley portion of the surface.

As a ninth modification, the virtual image display device may be applied to various vehicles such as an aircraft, a ship, or a casing (for example, a game casing) that does is not movable.

The invention claimed is:
1. A virtual image display device for displaying a virtual image, comprising:
a display that emits display light that is to be imaged as the virtual image;
a reflective mirror that has a reflective surface to reflect the display light emitted from the display; and
a housing that houses the display and the reflective mirror and has an opening through which the display light reflected by the reflective mirror exits the housing, wherein
the housing includes a wall structure on a portion of a surface of the housing such that an external light that enters the housing through the opening from an outside of the housing and is reflected by the reflective surface reaches the wall structure,
the wall structure includes a plurality of first walls that face in a first common direction and a plurality of second walls that face in a second common direction different from the first common direction,
the plurality of first walls and the plurality of second walls are alternately arranged and are connected to each other one by one along the surface of the housing,
a space where the virtual image is visible is defined as a visible area,
a straight line extending from one end of the reflective surface to a first wall is defined as an end reference first straight line,
an angle formed by the first wall with respect to the end reference first straight line is defined as an end reference first wall angle that is formed on a side of the first wall opposite to the one end of the reflective surface, wherein the end reference first wall angle is positive when formed on an exposed side of the surface with respect to the end reference first straight line and is negative when formed on a side opposite to the exposed side,
an angle formed by the first wall with respect to the end reference first straight line is defined as a visible area first critical angle that is formed on a side of the first wall opposite to the one end of the reflective surface, wherein the visible area first critical angle is positive when formed on the exposed side of the surface with respect to the end reference first straight line and is negative when formed on the side opposite to the exposed side, and the visible area first critical angle is virtually set such that a light travelling along the end reference first straight line from the one end of the reflective surface and incident on the first wall reaches one end of the visible area after reflected by the first wall,
a straight line extending from the other end of the reflective surface to a second wall is defined as an end reference second straight line,
an angle formed by the second wall with respect to the end reference second straight line is defined as an end reference second wall angle that is formed on a side of the second wall opposite to the other end of the reflective surface, wherein the end reference second wall angle is positive when formed on the exposed side of the surface with respect to the end reference second straight line and is negative when formed on the side opposite to the exposed side,
an angle formed by the second wall with respect to the end reference second straight line is defined as a visible area second critical angle that is formed on a side of the second wall opposite to the other end of the reflective surface, wherein the visible area second critical angle is positive when formed on the exposed side of the surface with respect to the end reference second straight line and is negative when formed on the side opposite to the exposed side, and the visible area second critical angle is virtually set such that a light travelling along the end reference second straight line from the other end of the reflective surface and incident on the second wall reaches the other end of the visible area after reflected by the second wall, and
each first wall and each second wall are formed such that the end reference first wall surface angle is larger than the end reference second wall surface angle, the end reference first wall angle is larger than the visible area first critical angle, and the end reference second wall angle is smaller than the visible area second critical angle.

2. The virtual image display device according to claim 1, wherein
an eyelips is defined as a virtual area that is set in advance based on a statistical distribution of positions of eyes of viewers,
a straight line extending from one end of the reflective surface to a first wall is defined as an end reference first straight line, an angle formed by the first wall with respect to the end reference first straight line is defined as an end reference first wall angle that is formed on a side of the first wall opposite to the one end of the reflective surface, wherein the end reference first wall angle is positive when formed on an exposed side of the surface with respect to the end reference first straight line and is negative when formed on a side opposite to the exposed side, an angle formed by the first wall with respect to the end reference first straight line is defined as an eyelips first critical angle that is formed on a side of the first wall opposite to the one end of the reflective surface, wherein the eyelips first critical angle is positive when formed on the exposed side of the surface with respect to the end reference first straight line and is negative when formed on the side opposite to the exposed side, and the eyelips first critical angle is virtually set such that a light travelling along the end reference first straight line from the one end of the reflective surface and incident on the first wall reaches one end of the eyelips after reflected by the first wall, a straight line extending from the other end of the reflective surface to a second wall is defined as an end reference second straight line, an angle formed by the second wall with respect to the end reference second straight line is defined as an end reference second wall angle that is formed on a side of the second wall opposite to the other end of the reflective surface, wherein the end reference second wall angle is positive when formed on the exposed side of the surface with respect to the end reference second straight line and is negative when formed on a side opposite to the exposed side, an angle formed by the second wall with respect to the end reference second straight line is defined as an eyelips second critical angle that is formed on a side of the second wall opposite to the other end of the reflective surface, wherein the eyelips second critical angle is positive when formed on the exposed side of the surface with respect to the end reference second straight line and is negative when formed on the side opposite to the exposed side, and the eyelips second critical angle is virtually set such that a light travelling along the end reference second straight line from the other end of the reflective surface and incident on the second wall reaches the other end of the eyelips after reflected by the second wall, and each first wall and each second wall are formed such that the end reference first wall angle is larger than the end reference second wall angle, the end reference first wall angle is larger than the eyelips first critical angle, and the end reference second wall angle is smaller than the eyelips second critical angle.

3. The virtual image display device according to claim 1, wherein a straight line extending from a first predetermined point on the reflective surface to a first wall is defined as a predetermined point reference first straight line, an angle formed by the first wall with respect to the predetermined point reference first straight line is defined as a predetermined point reference first wall angle that is formed on a side of the first wall opposite to the first predetermined point, wherein the predetermined point reference first wall angle is positive when formed on an exposed side of the surface with respect to the predetermined point reference first straight line and is negative when formed on a side opposite to the exposed side, and at least one first predetermined point that causes the predetermined point reference first wall angle to be larger than +90 degrees and smaller than +180 degrees exists on the reflective surface for each first wall.

4. The virtual image display device according to claim 3, wherein each first wall is formed such that the predetermined point reference first wall angle defined by taking an arbitrary point on the reflective surface as the first predetermined point is set to be larger than +90 degrees and smaller than +180 degrees.

5. The virtual image display device according to claim 1, wherein a straight line extending from a second predetermined point on the reflective surface to a second wall is defined as a predetermined point reference second straight line, an angle formed by the second wall with respect to the predetermined point reference second straight line is defined as a predetermined point reference second wall angle that is formed on a side of the second wall opposite to the second predetermined point, wherein the predetermined point reference second wall angle is positive when formed on an exposed side of the surface with respect to the predetermined point reference second straight line and is negative when formed on a side opposite to the exposed side, and each second wall is formed such that at least one second predetermined point that causes the predetermined point reference second wall angle to be larger than −90 degrees and smaller than 0 degree exists on the reflective surface.

6. The virtual image display device according to claim 5, wherein each second wall is formed such that the predetermined point reference second wall angle defined by taking an arbitrary point on the reflective surface as the second predetermined point is set to be larger than −90 degrees and smaller than 0 degree.

7. The virtual image display device according to claim 1, wherein the wall structure is formed such that, when the external light that is reflected by the reflective surface and reaches the first wall is further reflected by the first wall, the external light reaches the second wall.

8. The virtual image display device according to claim 1, wherein the reflective surface is virtually divided into a first condition satisfying region and a second condition satisfying region, a space where the virtual image is visible is defined as a visible area, a straight line extending from one end of the first condition satisfying region to a first wall is defined as an end reference first straight line, an angle formed by the first wall with respect to the end reference first straight line is defined as an end reference first wall angle that is formed on a side of the first wall opposite to the one end of the first condition satisfying region, wherein the end reference first wall angle is positive when formed on an exposed side of the surface with respect to the end reference first straight line and is negative when formed on a side opposite to the exposed side, an angle formed by the first wall with respect to the end reference first straight line is defined as a visible area first critical angle that is formed on a side of the first wall opposite to the one end of the first condition satisfying region, wherein the visible area first critical angle is positive when formed on the exposed side of the surface with respect to the end reference first straight line and is negative when formed on the side opposite to the exposed side, and the visible area first critical angle is virtually set such that a light travelling along the end reference first straight line from the one end of the first condition satisfying region and incident on the first wall reaches one end of the visible area after reflected by the first wall, a straight line extending from the other end of the reflective surface to a second wall is defined as an end reference second straight line, an angle formed by the second wall with respect to the end reference second straight line is defined as an end reference second wall angle that is formed on a side of the second wall opposite to the other one end of the first condition satisfying region, wherein the end reference second wall angle is positive when formed on the exposed side of the surface with respect to the end reference second straight line and is negative when formed on the side opposite to the exposed side, an angle formed by the second wall with respect to the end reference second straight line is defined as a visible area second critical angle that is formed on a side of the second wall opposite to the other end of the first condition satisfying region, wherein the visible area second critical angle is positive when formed on the exposed side of the surface with respect to the end reference second straight line and is negative when formed on the side opposite to the exposed side, and the visible area second critical angle is virtually set such that a light travelling along the end reference second straight line from the other end of the first condition satisfying region and incident on the second wall reaches the other end of the visible area after reflected by the second wall, a straight line extending from a first predetermined point on the second condition satisfying region to the first wall is defined as a predetermined point reference first straight line, an angle formed by the first wall with respect to the end reference first straight line is defined as a predetermined point reference first wall angle that is formed on a side of the first wall opposite to the first predetermined point, wherein the predetermined point reference first wall angle is positive when formed on the exposed side of the surface with respect to the end reference first straight line and is negative when formed on the side opposite to the exposed side, and the first wall and the second wall that are adjacent to each other are formed such that the end reference first wall angle is larger than the end reference second wall angle, the end reference first wall angle is larger than the visible area first critical angle, and the end reference second wall angle is smaller than the visible area second critical angle, and the first wall among the first wall and the second wall that are adjacent to each other is formed such that the predetermined point reference first wall angle defined by taking an arbitrary point on the second condition satisfying region is larger than +90 degrees and smaller than +180 degrees.

9. The virtual image display device according to claim 8, wherein a straight line extending from a second predetermined point on the second condition satisfying region to the second wall is defined as a predetermined point reference second straight line, an angle formed by the second wall with respect to the end reference second straight line is defined as a predetermined point reference second wall angle that is formed on a side of the second wall opposite to the second predetermined point, wherein the predetermined point reference second wall angle is positive when formed on the exposed side of the surface with respect to the end reference second straight line and is negative when formed on the side opposite to the exposed side, and the second wall among the first wall and the second wall that are adjacent to each other is formed such that the predetermined point reference second wall angle defined by taking an arbitrary point on the second condition satisfying region as the second predetermined point is larger than −90 degrees and smaller than 0 degree.

10. The virtual image display device according to claim 1, wherein the reflective surface is virtually divided into a first condition satisfying region and a second condition satisfying region, a space where the virtual image is visible is defined as a visible area, a straight line extending from one end of the first condition satisfying region to a first wall is defined as an end reference first straight line, an angle formed by the first wall with respect to the end reference first straight line is defined as an end reference first wall angle that is formed on a side of the first wall opposite to the one end of the first condition satisfying region, wherein the end reference first wall angle is positive when formed on an exposed side of the surface with respect to the end reference first straight line and is negative when formed on a side opposite to the exposed side, an angle formed by the first wall with respect to the end reference first straight line is defined as a visible area first critical angle that is formed on a side of the first wall opposite to the one end of the first condition satisfying region, wherein the visible area first critical angle is positive when formed on the exposed side of the surface with respect to the end reference first straight line and is negative when formed on the side opposite to the exposed side, and the visible area first critical angle is virtually set such that a light travelling along the end reference first straight line from the one end of the first condition satisfying region and incident on the first wall reaches the one end of the visible area after reflected by the first wall, a straight line extending from the other end of the reflective surface to a second wall is defined as an end reference second straight line, an angle formed by the second wall with respect to the end reference second straight line is defined as an end reference second wall angle that is formed on a side of the second wall opposite to the other one end of the first condition satisfying region, wherein the end reference second wall angle is positive when formed on the exposed side of the surface with respect to the end reference second straight line and is negative when formed on the area opposite to the exposed side, an angle formed by the second wall with respect to the end reference second straight line is defined as a visible area second critical angle that is formed on a side of the second wall opposite to the other end of the first condition satisfying region, wherein the visible area second critical angle is positive when formed on the exposed side of the surface with respect to the end reference second straight line and is negative when formed on the side opposite to the exposed side, and the visible area second critical angle is virtually set such that a light travelling along the end reference second straight line from the other end of the first condition satisfying region and incident on the second wall reaches the other end of the visible area after reflected by the second wall, a straight line extending from a second predetermined point on the second condition satisfying region to the second wall is defined as a predetermined point reference second straight line, an angle formed by the second wall with respect to the end reference second straight line is defined as a predetermined point reference second wall angle that is formed on a side of the second wall opposite to the second predetermined point, wherein the predetermined point reference second wall angle is positive when formed on the exposed side of the surface with respect to the end reference second straight line and is negative when formed on the side opposite to the exposed side, and the first wall and the second wall that are adjacent to each other are formed such that the end reference first wall angle is larger than the end reference second wall angle, the end reference first wall angle is larger than the visible area first critical angle, and the end reference second wall angle is smaller than the visible area second critical angle, and the second wall among the first wall and the second wall that are adjacent to each other is formed such that the predetermined point reference second wall angle defined by taking an arbitrary point on the second condition satisfying region as the second predetermined point is larger than −90 degrees and smaller than 0 degree.

11. The virtual image display device according to claim 10, wherein
a straight line extending from a first predetermined point on the second condition satisfying region to the first wall is defined as a predetermined point reference first straight line, an angle formed by the first wall with respect to the end reference first straight line is defined as a predetermined point reference first wall angle that is formed on a side of the first wall opposite to the first predetermined point, wherein the predetermined point reference first wall angle is positive when formed on the exposed side of the surface with respect to the end reference first straight line and is negative when formed on the side opposite to the exposed side, and the first wall among the first wall and the second wall that are adjacent to each other is formed such that the predetermined point reference first wall angle defined by taking an arbitrary point on the second condition satisfying region as the first predetermined point is larger than +90 degrees and smaller than +180 degrees.

12. The virtual image display device according to claim 1, wherein the reflective surface is virtually divided into a first condition satisfying region and a second condition satisfying region, an eyelips is defined as a virtual area that is set in advance based on a statistical distribution of positions of eyes of viewers, a straight line extending from one end of the first condition satisfying region to a first wall is defined as an end reference first straight line, an angle formed by the first wall with respect to the end reference first straight line is defined as an end reference first wall angle that is formed on a side of the first wall opposite to the one end of the first condition satisfying region, wherein the end reference first wall angle is positive when formed on an exposed side of the surface with respect to the end reference first straight line and is negative when formed on a side opposite to the exposed side, an angle formed by the first wall with respect to the end reference first straight line is defined as an eyelips first critical angle that is formed on a side of the first wall opposite to the one end of the first condition satisfying region, wherein the eyelips first critical angle is positive when formed on the exposed side of the surface with respect to the end reference first straight line and is negative when formed on the side opposite to the exposed side, and the eyelips first critical angle is virtually set such that a light travelling along the end reference first straight line from the one end of the first condition satisfying region and incident on the first wall reaches one end of the eyelips after reflected by the first wall, a straight line extending from the other end of the first condition satisfying region to a second wall is defined as an end reference second straight line, an angle formed by the second wall with respect to the end reference second straight line is defined as an end reference second wall angle that is formed on a side of the second wall opposite to the other one end of the first condition satisfying region, wherein the end reference second wall angle is positive when formed on the exposed side of the surface with respect to the end reference second straight line and is negative when formed on the side opposite to the exposed side, an angle formed by the second wall with respect to the end reference second straight line is defined as an eyelips second critical angle that is formed on a side of the second wall opposite to the other end of the first condition satisfying region, wherein the eyelips second critical angle is positive when formed on the exposed side of the surface with respect to the end reference second straight line and is negative when formed on the side opposite to the exposed side, and the eyelips second critical angle is virtually set such that a light travelling along the end reference second straight line from the other end of the first condition satisfying region and incident on the second wall reaches the other end of the eyelips after reflected by the second wall, a straight line extending from a first predetermined point on the second condition satisfying region to the first wall is defined as a predetermined point reference first straight line, an angle formed by the first wall with respect to the end reference first straight line is defined as a predetermined point reference first wall angle that is formed on a side of the first wall opposite to the first predetermined point, wherein the predetermined point reference first wall angle is positive when formed on the exposed side of the surface with respect to the end reference first straight line and is negative when formed on the side opposite to the exposed side, and the first wall and the second wall that are adjacent to each other are formed such that the end reference first wall angle is larger than the end reference second wall angle, the end reference first wall angle is larger than the eyelips first critical angle, and the end reference second wall angle is smaller than the eyelips second critical angle, and the first wall among the first wall and the second wall that are adjacent to each other is formed such that the predetermined point reference first wall angle defined by taking an arbitrary point on the second condition satisfying region is larger than +90 degrees and smaller than +180 degrees.

13. The virtual image display device according to claim 1, wherein the reflective surface is virtually divided into a first condition satisfying region and a second condition satisfying region, an eyelips is defined as a virtual area that is set in advance based on a statistical distribution of positions of eyes of viewers, a straight line extending from one end of the first condition satisfying region to a first wall is defined as an end reference first straight line, an angle formed by the first wall with respect to the end reference first straight line is defined as an end reference first wall angle that is formed on a side of the first wall opposite to the one end of the first condition satisfying region, wherein the end reference first wall angle is positive when formed on an exposed side of the surface with respect to the end reference first straight line and is negative when formed on a side opposite to the exposed side, an angle formed by the first wall with respect to the end reference first straight line is defined as an eyelips first critical angle that is formed on a side of the first wall opposite to the one end of the first condition satisfying region, wherein the eyelips first critical angle is positive when formed on the exposed side of the surface with respect to the end reference first straight line and is negative when formed on the side opposite to the exposed side, and the eyelips first critical angle is virtually set such that a light travelling along the end reference first straight line from the one end of the first condition satisfying region and incident on the first wall reaches one end of the eyelips after reflected by the first wall, a straight line extending from the other end of the first condition satisfying region to a second wall is defined as an end reference second straight line, an angle formed by the second wall with respect to the end reference second straight line is defined as an end reference second wall angle that is formed on a side of the second wall opposite to the other one end of the first condition satisfying region, wherein the end reference second wall angle is positive when formed on the exposed side of the surface with respect to the end reference second straight line and is negative when formed on the side opposite to the exposed side, an angle formed by the second wall with respect to the end reference second straight line is defined as an eyelips second critical angle that is formed on a side of the second wall opposite to the other end of the first condition satisfying region, wherein the eyelips second critical angle is positive when formed on the exposed side of the surface with respect to the end reference second straight line and is negative when formed on the side opposite to the exposed side, and the eyelips second critical angle is virtually set such that a light travelling along the end reference second straight line from the other end of the first condition satisfying region and incident on the second wall reaches the other end of the eyelips after reflected by the second wall, a straight line extending from a second predetermined point on the second condition satisfying region to the second wall is defined as a predetermined point reference second straight line, an angle formed by the second wall with respect to the end reference second straight line is defined as a predetermined point reference second wall angle that is formed on a side of the second wall opposite to the second predetermined point, wherein the predetermined point reference second wall angle is positive when formed on the exposed side of the surface with respect to the end reference second straight line and is negative when formed on the side opposite to the exposed side, and the first wall and the second wall that are adjacent to each other are formed such that the end reference first wall angle is larger than the end reference second wall angle, the end reference first wall angle is larger than the eyelips first critical angle, and the end reference second wall angle is smaller than the eyelips second critical angle, and the second wall among the first wall and the second wall that are adjacent to each other is formed such that the predetermined point reference second wall angle defined by taking an arbitrary point on the second condition satisfying region as the second predetermined point is larger than −90 degrees and smaller than 0 degree.

14. The virtual image display device according to claim 1, wherein the wall structure has a plurality of different gradient regions that are offset from each other in a connecting direction in which the plurality of first walls and the plurality of second walls are connected to each other, and the plurality of first walls in one of the plurality of different gradient regions have a gradient different from that of the plurality of first walls in another of the plurality of different gradient regions, or the plurality of second walls in the one of the plurality of different gradient regions have a gradient different from that of the plurality of second walls in the other of the plurality of different gradient regions.

15. The virtual image display device according to claim 1, wherein the virtual image is imaged by projecting the display light reflected by the reflective mirror onto a projection screen that is disposed outside of the housing, and the portion having the wall structure includes a portion of the surface that faces the projection screen.

16. The virtual image display device according to claim 15, wherein the portion having the wall structure includes the portion that is exposed to an outside of the housing to face the projection screen.

17. The virtual image display device according to claim 15, wherein
    the portion having the wall structure includes the portion that is housed in the housing and faces the projection screen through the opening.

18. The virtual image display device according to claim 1, wherein
    the portion having the wall structure includes a portion of the surface that is formed by a side wall.

\* \* \* \* \*